United States Patent
Lv et al.

(10) Patent No.: US 9,389,744 B2
(45) Date of Patent: Jul. 12, 2016

(54) METHOD AND APPARATUS FOR DETECTING DISTANCE BETWEEN TWO POINTS ON RESISTIVE TOUCH PANEL

(71) Applicant: Actions Semiconductor Co., Ltd., Zhuhai (CN)

(72) Inventors: Lianguo Lv, Zhuhai (CN); Jiang Xiong, Zhuhai (CN)

(73) Assignee: ACTIONS (ZHUHAI) TECHNOLOGY CO., LIMITED, Zhuhai (CN)

( * ) Notice: Subject to any disclaimer, the term of this patent is extended or adjusted under 35 U.S.C. 154(b) by 131 days.

(21) Appl. No.: 14/142,336

(22) Filed: Dec. 27, 2013

(65) Prior Publication Data

US 2014/0111477 A1  Apr. 24, 2014

Related U.S. Application Data

(63) Continuation of application No. PCT/CN2012/076418, filed on Jun. 4, 2012.

(30) Foreign Application Priority Data

Jun. 27, 2011 (CN) .......................... 2011 1 0174946
Sep. 16, 2011 (CN) .......................... 2011 1 0282244

(51) Int. Cl.
 *G06F 3/045* (2006.01)
 *G06F 3/041* (2006.01)
(52) U.S. Cl.
 CPC .............. *G06F 3/045* (2013.01); *G06F 3/0416* (2013.01)
(58) Field of Classification Search
 CPC .................. G06F 3/045; G06F 2203/04113
 USPC ................................................. 345/173, 174
 See application file for complete search history.

(56) References Cited

U.S. PATENT DOCUMENTS

| 2009/0322701 | A1 | 12/2009 | D'Souza et al. |
| 2010/0277417 | A1 | 11/2010 | Sarasmo |

(Continued)

FOREIGN PATENT DOCUMENTS

| CN | 101493744 | 7/2009 |
| CN | 101644984 | 2/2010 |

(Continued)

OTHER PUBLICATIONS

International Search Report for corresponding International Application No. PCT/CN2012/076418, mailed on Sep. 13, 2012, in 5 pages.

(Continued)

*Primary Examiner* — Sanghyuk Park
(74) *Attorney, Agent, or Firm* — Knobbe Martens Olson & Bear LLP

(57) ABSTRACT

Provided are a resistive touch panel detection method and apparatus. A resistance variance ratio of a Y plane relative to an X plane is calculated based on voltage detections before touching and after a two-point touch occurs; and then the inclination angle is calculated based on corresponding relationship between the inclination angle and the resistance variance ratio. To obtain a distance between the two points, the present invention the resistance variance ratio and a first ratio of a resistance variance of any one of the X plane and the Y plane relative to a total resistance of the any one plane are calculated; then a second ratio of an equivalent contact resistance at a midpoint relative to the total resistance is calculated; and the distance is calculated based on the resistance variance ratio, the first ratio, the second ratio, and a correlated relationship of the distance between the two points.

18 Claims, 11 Drawing Sheets

(56) References Cited

U.S. PATENT DOCUMENTS

| | | | |
|---|---|---|---|
| 2011/0025642 A1 | 2/2011 | Tada et al. | |
| 2012/0001866 A1* | 1/2012 | Rapakko | G06F 3/044 345/174 |
| 2012/0249472 A1* | 10/2012 | Hong | G06F 3/045 345/174 |
| 2013/0069900 A1* | 3/2013 | Yang | G06F 3/041 345/173 |
| 2013/0278541 A1* | 10/2013 | Hernandez | G06F 3/045 345/174 |

FOREIGN PATENT DOCUMENTS

| | | |
|---|---|---|
| CN | 101943979 A | 1/2011 |
| CN | 102033674 A | 4/2011 |
| WO | WO 2010/137046 | 12/2010 |
| WO | WO 2013/000356 | 1/2013 |

OTHER PUBLICATIONS

Written Opinion for corresponding International Application No. PCT/CN2012/076418, mailed on Sep. 13, 2012, in 11 pages.

International Preliminary Report on Patentability for corresponding International Application No. PCT/CN2012/076418, issued on Jan. 7, 2014, in 13 pages.

Office Action issued in Chinese Patent Application No. 201110282244X, on May 6, 2013.

Office Action issued in Chinese Patent Application No. 2011101749466, dated Dec. 1, 2014, in 28 pages.

Extended European Search Report for European Patent Application No. 12804421.1, dated Jun. 2, 2015, in 9 pages.

* cited by examiner

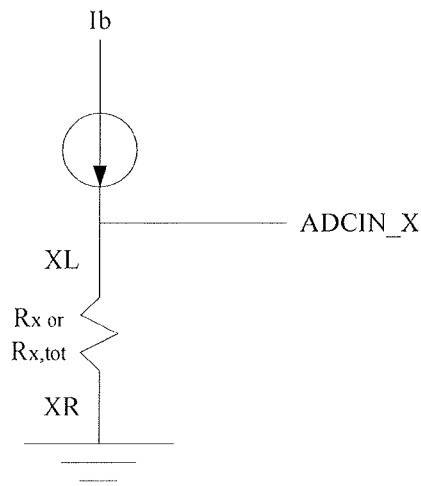
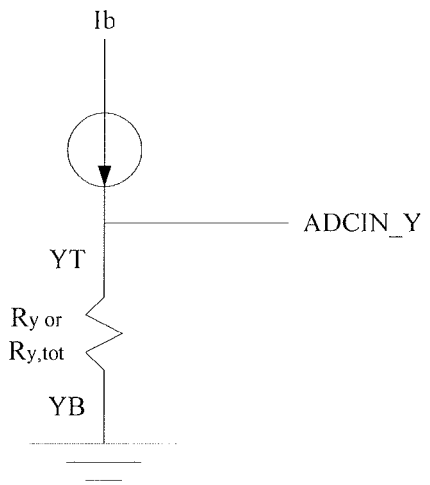
FIG. 7a                FIG. 7b
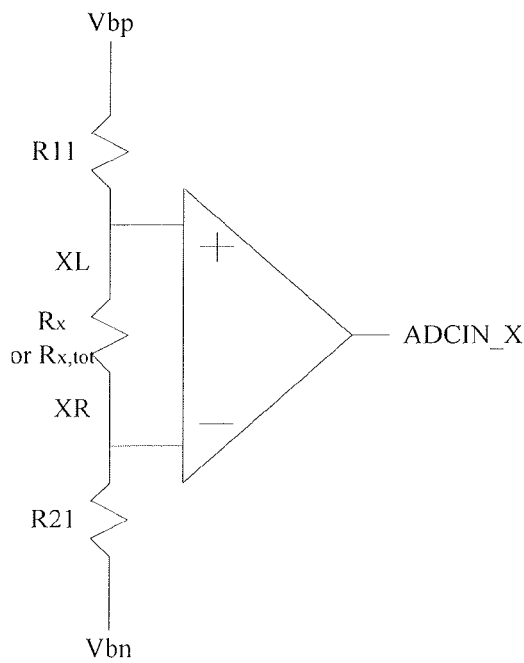
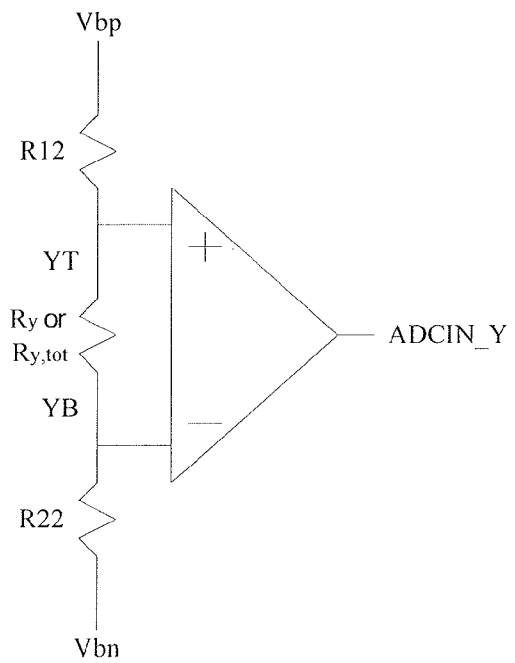
FIG. 8a                FIG. 8b

METHOD AND APPARATUS FOR DETECTING DISTANCE BETWEEN TWO POINTS ON RESISTIVE TOUCH PANEL

CROSS-REFERENCE TO RELATED APPLICATIONS

This application is a continuation of International Patent Application No. PCT/CN2012/076418, filed on Jun. 4, 2012, which claims priority to Chinese Patent Application No. 201110174946.6, filed on Jun. 27, 2011, and Chinese Patent Application No. 201110282244.X, filed on Sep. 16, 2011, all of which are incorporated herein by reference in their entireties.

FIELD OF THE INVENTION

The present invention relates to touch panel detection technologies, and more particularly to a resistive touch panel detection method and apparatus which can be suitable for two-point touch.

DESCRIPTION OF THE RELATED ART

A touch panel is also referred as touch screen, and is an induction type liquid crystal display device. When for example, a contact or a finger etc. touches the touch panel at a position of a prompt graphic displayed on the touch panel, the touch panel can sense a touch point where the touching occurs, and use a position or position change trend of the sensed touch point to replace a variety of mechanical operations.

A resistive touch panel is a common touch panel. The resistive touch panel usually includes two uniform conductive indium tin oxide (ITO) semiconductor layers which are also referred as resistive films. The two ITO layers are separated and supported by a dielectric. The two ITO layers corresponds to a X direction coordinate and a Y direction coordinate which represent a position of a touch point, respectively, and thus the two ITO layers can further be called as X plane and Y plane, respectively.

Upon occurrence of a single-point touch, the X plane contacts the Y plane at only one touch point. At this moment, an X direction coordinate and a Y direction coordinate of the touch point, i.e., a position of the touch point, can be detected based on a partial pressure principle, so that the single-point touch with a determined position can be used to replace mechanical mouse operations such as click, double clicks, etc. Further, a position change trend of the touch point can also be obtained by detecting positions of the touch point at different times, so that the single-point touch with a determined position change trend can realize operations such as dragging, scrolling, etc.

Upon occurrence of two-point touch, the X plane contacts the Y plane at two points. At this moment, an X direction coordinate and a Y direction coordinate of only a midpoint point between the touch points, i.e., a position of the midpoint, can be detected based on the partial pressure principle. Thus, in case of two-point touch, the existing detection method can only estimate a length change trend of a distance between the two points so as to determine a relative position change trend of the two points, so that the relative position change trend can realize operations such as zoom in, zoom out, etc.

However, the existing detection method cannot obtain an inclination angle of a connecting line between two points, a specific size of a distance between the two points and actual coordinates of the two points. Thus, operations such as rotation, etc. cannot be realized according to the inclination angle of the connecting line between the two points; an accurate scaling ratio of an operation such as zoom in, zoom out, etc., cannot be determined according to the specific size of the distance between the two points; a combination of operations such as click, double click, drag, scrolling, etc., cannot be realized according to the actual coordinates of the two points.

Similarly, a detection device in the related art which is based on the same principle as that of the above detection method, also cannot obtain the inclination angle of the connecting line between the two points, the specific size of the distance between the two points and the actual coordinates of the two points.

SUMMARY OF THE INVENTION

In view of this, the present invention provides a resistive touch panel detection method and apparatus, which can detect an inclination angle of a connecting line between two points, a distance between the two points, and can also further detect actual coordinates of the two points.

The present invention provides a resistive touch panel detection method, and the method includes:

step a1: calculating a resistance variance ratio of a Y plane relative to an X plane, based on voltage detections before touching and after a two-point touch occurs; wherein the resistance variance ratio is proportional to a voltage variance ratio of the Y plane relative to the X plane;

step a2: according to a preset corresponding relationship between an inclination angle of a connecting line between two points and the resistance variance ratio, calculating the inclination angle.

Preferably, the voltage detection of the step a1 is achieved by applying current excitation to the X plane and the Y plane, respectively, and detecting a voltage of an end which is of each of the X plane and the Y plane, wherein the end which is of each of the X plane and the Y plane is connected with a current source; and the resistance variance ratio obtained in the step a1 via calculation equals to the voltage variance ratio of the Y plane relative to the X plane; or, the voltage detection of the step a1 is achieved by connecting in series external resistors to the two ends of each of the X plane and the Y plane respectively or only one end of each of the X plane and the Y plane, applying voltage excitation to two ends which connect the external resistors in series, respectively, and detecting a voltage difference between the two ends of each of the X plane and the Y plane; and the resistance variance ratio obtained in the step a1 via calculation equals to a product of the voltage variance ratio of the Y plane relative to the X plane and a preset scaling factor.

Preferably, the corresponding relationship is $k_{xy} \tan \theta = \sqrt{\Delta R_y / \Delta R_x}$, where, $k_{xy}$ is a ratio coefficient between the Y plane and the X plane, $\theta$ is the inclination angle with reference to an X direction corresponding to the X plane, $\Delta R_y$ is a resistance variance of the Y plane, $\Delta R_x$ is a resistance variance of the X plane.

The present invention provides another resistive touch panel detection method, which includes:

step b1: based on voltage detections before touching and after a two-point touch occurs, calculating a resistance variance ratio of a Y plane relative to an X plane as well as a first ratio of a resistance variance of any one of the X plane and the Y plane relative to a total resistance of the any one plane; wherein the resistance variance ratio is proportional to a voltage variance ratio of the Y plane relative to the X plane, the first ratio is proportional to a ratio between a voltage variance of the any one plane and a voltage of the any one plane when there is no touching;

step b2: based on a contact resistance detection after a two-point touch occurs, calculating a second ratio of an equivalent contact resistance at a midpoint between the two points relative to the total resistance of the any one plane; wherein the contact resistance detection is based on a resistance partial pressure ratio of the contact resistance relative to the any one plane as well as a coordinate of the midpoint in the any one plane; the second ratio equals to a product of the resistance partial pressure ratio and a dividing ratio of the total resistance of the any one plane created by the midpoint;

step b3: calculating a distance between the two points according to the resistance variance ratio, the first ratio, the second ratio and a correlated relationship of the distance between the two points; wherein the correlated relationship is established in advance, according to resistance relationship of the X plane and the Y plane after a two-point touch occurs and based on corresponding relationship between an inclination angle of a connecting line between two points and the resistance variance ratio.

Preferably, the voltage detection of the step b1 is achieved by applying current excitation to the X plane and the Y plane, respectively, and detecting a voltage of an end which is of each of the X plane and the Y plane, wherein is of each of the X plane and the Y plane is connected with a current source; and the resistance variance ratio obtained in the step b1 via calculation equals to a voltage variance ratio of the Y plane relative to the X plane; the first ratio equals to a ratio of a voltage variance of the any one plane relative to a voltage of the any one plane when there is no touching; or, the voltage detection of the step b1 is achieved by connecting in series external resistors to the two ends of each of the X plane and the Y plane respectively or only one end of each of the X plane and the Y plane, applying voltage excitation to two ends which connect the external resistors in series, respectively, and detecting a voltage difference between the two ends of each of the X plane and the Y plane; and the resistance variance ratio obtained in the step b1 via calculation equals to a product of a voltage variance ratio of the Y plane relative to the X plane and a preset first scaling factor; the first ratio equals to a product of a ratio of a voltage variance of the any one plane relative to a voltage of the any one plane when there is no touching and a preset second scaling factor.

Preferably, detection of the midpoint's coordinate in the X plane of the step b1 is realized by applying voltage excitation to the two ends of the X plane and by a voltage of a short contact point obtained through connecting the two ends of the Y plane via external resistors having a same resistance value; detection of the midpoint's coordinate in the Y plane of the step b2 is realized by applying voltage excitation to the two ends of the Y plane and by a voltage of a short contact point obtained through connecting the two ends of the X plane via external resistors having a same resistance value.

Preferably, detection of the resistance partial pressure ratio in the step b2 is realized by applying voltage excitation on the end of the any one plane and any end of the other plane, and taking the other end of the any one plane and the other end of the other one plane as voltage detection points; the resistance partial pressure ratio obtained in the step b2 is a partial pressure ratio of the contact resistance relative to one segment of resistance in the any one plane; the one segment of resistance is from an end of the any one plane to one of the two points.

Preferably, the any one plane is the X plane, the correlated relationship of the step b3 includes:

$$x_{2,ratio} = \frac{(1+\sqrt{\Delta R_y/\Delta R_x})\frac{\Delta R_x}{R_{x,tot}} + \sqrt{(1+\sqrt{\Delta R_y/\Delta R_x})^2\left(\frac{\Delta R_x}{R_{x,tot}}\right)^2 + 8\frac{\Delta R_x}{R_{x,tot}}z_{ratio}}}{2};$$

$$z_{2,ratio} = \frac{R_{touch}}{R_{x,tot}} + \sqrt{\left(\frac{R_{touch}}{R_{x,tot}}\right)^2 + \frac{R_{touch}}{R_{x,tot}}(1+\sqrt{\Delta R_y/\Delta R_x})\left[1 - \frac{x_{2,ratio}}{2D(x_{mid})}\right]x_{2,ratio}}$$

or $$z_{ratio} = 2\frac{R_{touch}}{R_{x,tot}};$$

$$k_{xy}\tan\theta = \sqrt{\Delta R_y/\Delta R_x};$$

$$y_{2,ratio} = x_{2,ratio}\tan\theta/k_{xy};$$

where, $x_{2,ratio}$ is a normalized distance between two points in the X plane; $\Delta R_y$ is the resistance variance of the Y plane, $\Delta R_x$ is the resistance variance of the X plane, $R_{x,tot}$ is a total resistance of the X plane, $\Delta R_y/\Delta R_x$ is the resistance variance ratio, $\Delta R_x/R_{x,tot}$ is the first ratio; $z_{ratio}$ is a ratio of the contact resistance at each touch point relative to the total resistance of the X plane; $R_{touch}$ is the equivalent contact resistance, $$\frac{R_{touch}}{R_{x,tot}}$$

is the second ratio; $D(x_{mid})$ is a dividing ratio of the total resistance $R_{x,tot}$ of the X plane created by the midpoint; $k_{xy}\tan\theta=\sqrt{\Delta R_y/\Delta R_x}$ is the corresponding relationship, $k_{xy}$ is a ratio coefficient between the Y plane and the X plane, $\theta$ is the inclination angle with reference to an X direction corresponding to the X plane; $y_{2,ratio}$ is a normalized distance between two points in the Y plane.

The detection method further includes:

step b4: based on voltage relationship between two ends of each of the X plane and the Y plane, judging and obtaining a quadrant trend of the connecting line between the two points; wherein, after voltage relationship between two ends of one of the X plane and the Y plane is determined, the quadrant trend is determined according to a positive or negative direction of a voltage difference between two ends of the other one of the X plane and the Y plane;

step b5: based on the quadrant trend, coordinates of the midpoint in the X plane and the Y plane as well as the distances between the two points in the X plane and the Y plane, calculating coordinates of the two points in the X plane and the Y plane; wherein the coordinates of the two points in the X plane are the coordinate of the midpoint in the X plane plus or minus one half of the distance between the two points in the X plane, respectively; the coordinates of the two points in the Y plane are the coordinate of the midpoint in the Y plane plus or minus one half of the distance between the two points in the Y plane, respectively; the plus or minus is determined by coordinate increasing and decreasing relationship of the two points relative to the midpoint, and the coordinate increasing and decreasing relationship is represented by the quadrant trend.

The present invention provides a resistive touch panel detection apparatus, which includes:

a resistance change detection module configured to, calculate a resistance variance ratio of a Y plane relative to an X plane, based on voltage detections before touching and after a two-point touch occurs; wherein the resistance variance ratio is proportional to a voltage variance ratio of the Y plane relative to the X plane;

an inclination angle calculation module configured to, according to a preset corresponding relationship between an inclination angle of a connecting line between two points and the resistance variance ratio, calculate the inclination angle.

Preferably, the voltage detection of the resistance change detection module is achieved by applying current excitation to the X plane and the Y plane, respectively, and detecting a voltage of an end which is of each of the X plane and the Y plane, wherein the end which is of each of the X plane and the Y plane is connected with a current source; and the resistance variance ratio obtained by the resistance change detection module via calculation equals to the voltage variance ratio of the Y plane relative to the X plane; or, the voltage detection of the resistance change detection module is achieved by connecting in series external resistors to the two ends of each of the X plane and the Y plane respectively or only one end of each of the X plane and the Y plane, applying voltage excitation to two ends which connect the external resistors in series, respectively, and detecting a voltage difference between the two ends of each of the X plane and the Y plane; and the resistance variance ratio obtained by of the resistance change detection module via calculation equals to a product of the voltage variance ratio of the Y plane relative to the X plane and a preset scaling factor.

Preferably, the corresponding relationship is $k_{xy} \tan \theta = \sqrt{\Delta R_y / \Delta R_x}$, where, $k_{xy}$ is a ratio coefficient between the Y plane and the X plane, $\theta$ is the inclination angle with reference to an X direction corresponding to the X plane, $\Delta R_y$ is a resistance variance of the Y plane, $\Delta R_x$ is a resistance variance of the X plane.

The present invention provides a resistive touch panel detection apparatus, which includes:

a resistance change detection module configured to, based on voltage detections before touching and after a two-point touch occurs, calculate a resistance variance ratio of a Y plane relative to an X plane as well as a first ratio of a resistance variance of any one of the X plane and the Y plane relative to a total resistance of the any one plane; wherein the resistance variance ratio is proportional to a voltage variance ratio of the Y plane relative to the X plane, the first ratio is proportional to a ratio between a voltage variance of the any one plane and a voltage of the any one plane when there is no touching;

a contact resistance detection module configured to, based on a contact resistance detection after a two-point touch occurs, calculate a second ratio of an equivalent contact resistance at a midpoint between the two points relative to the total resistance of the any one plane; wherein the contact resistance detection is based on a resistance partial pressure ratio of the contact resistance relative to the any one plane as well as a coordinate of the midpoint in the any one plane; the second ratio equals to a product of the resistance partial pressure ratio and a dividing ratio of the total resistance of the any one plane created by the midpoint;

a distance of two points calculation module configured to calculate a distance between the two points according to the resistance variance ratio, the first ratio, the second ratio and a correlated relationship of the distance between the two points; wherein the correlated relationship is established in advance, according to resistance relationship of the X plane and the Y plane after a two-point touch occurs and based on corresponding relationship between an inclination angle of a connecting line between two points and the resistance variance ratio.

Preferably, the voltage detection of the resistance change detection module is achieved by applying current excitation to the X plane and the Y plane, respectively, and detecting a voltage of an end which is of each of the X plane and the Y plane, wherein the end which is of each of the X plane and the Y plane is connected with a current source; and the resistance variance ratio obtained by the resistance change detection module via calculation equals to a voltage variance ratio of the Y plane relative to the X plane; the first ratio equals to a ratio of a voltage variance of the any one plane relative to a voltage of the any one plane when there is no touching; or, the voltage detection of the resistance change detection module is achieved by connecting in series external resistors to the two ends of each of the X plane and the Y plane respectively or only one end of each of the X plane and the Y plane, applying voltage excitation to two ends which connect the external resistors in series, respectively, and detecting a voltage difference between the two ends of each of the X plane and the Y plane; and the resistance variance ratio obtained by the resistance change detection module via calculation equals to a product of a voltage variance ratio of the Y plane relative to the X plane and a preset first scaling factor; the first ratio equals to a product of a ratio of a voltage variance of the any one plane relative to a voltage of the any one plane when there is no touching and a preset second scaling factor.

Preferably, detection of the midpoint's coordinate in the X plane of the contact resistance detection module is realized by applying voltage excitation to the two ends of the X plane and by a voltage of a short contact point obtained through connecting the two ends of the Y plane via external resistors having a same resistance value; detection of the midpoint's coordinate in the Y plane of the contact resistance detection module is realized by applying voltage excitation to the two ends of the Y plane and by a voltage of a short contact point obtained through connecting the two ends of the X plane via external resistors having a same resistance value.

Preferably, detection of the resistance partial pressure ratio of the contact resistance detection module is realized by applying voltage excitation on the end of the any one plane and any end of the other plane, and taking the other end of the any one plane and the other end of the other one plane as voltage detection points; the resistance partial pressure ratio obtained by the contact resistance detection module is a partial pressure ratio of the contact resistance relative to one segment of resistance in the any one plane; the one segment of resistance is from an end of the any one plane to one of the two points.

Preferably, the any one plane is the X plane, the correlated relationship which the distance of two points calculation module is based on includes:

$$X_{2,ratio} = \frac{\left(1 + \sqrt{\Delta R_y / \Delta R_x}\right)\frac{\Delta R_x}{R_{x,tot}} + \sqrt{\left(1 + \sqrt{\Delta R_y / \Delta R_x}\right)^2 \left(\frac{\Delta R_x}{R_{x,tot}}\right)^2 + 8\frac{\Delta R_x}{R_{x,tot}} z_{ratio}}}{2};$$

$$Z_{2,ratio} = \frac{R_{touch}}{R_{x,tot}} + \sqrt{\frac{\left(\frac{R_{touch}}{R_{x,tot}}\right)^2 + \frac{R_{touch}}{R_{x,tot}}}{\left(1 + \sqrt{\Delta R_y / \Delta R_y}\right)\left[1 - \frac{X_{2,ratio}}{2D(X_{mid})}\right] X_{2,ratio}}}$$

-continued or $$z_{ratio} = 2\frac{R_{touch}}{R_{x,tot}};$$

$$k_{xy}\tan\theta = \sqrt{\Delta R_y/\Delta R_x};$$

$$y_{2,ratio} = x_{2,ratio}\tan\theta/k_{xy};$$

where, $x_{2,ratio}$ is a normalized distance between two points in the X plane; $\Delta R_y$ is the resistance variance of the Y plane, $\Delta R_X$ is the resistance variance of the X plane, $R_{x,tot}$ is a total resistance of the X plane, $\Delta R_y/\Delta R_X$ is the resistance variance ratio, $\Delta R_x/R_{x,tot}$ is the first ratio; $z_{ratio}$ is a ratio of the contact resistance at each touch point relative to the total resistance of the X plane; $R_{touch}$ is the equivalent contact resistance, $$\frac{R_{touch}}{R_{x,tot}}$$

is the second ratio; $D(x_{mid})$ is a dividing ratio of the total resistance $R_{x,tot}$ of the X plane created by the midpoint; $k_{xy}$ tan $\theta = \sqrt{\Delta R_y/\Delta R_x}$ is the corresponding relationship, $k_{xy}$ is a ratio coefficient between the Y plane and the X plane, $\theta$ is the inclination angle with reference to an X direction corresponding to the X plane; $y_{2,ratio}$ is a normalized distance between two points in the Y plane.

The detection apparatus further includes:

a quadrant trend judgment module configured to, based on voltage relationship between two ends of each of the X plane and the Y plane, judge and obtain a quadrant trend of the connecting line between the two points; wherein, after voltage relationship between two ends of one of the X plane and the Y plane is determined, the quadrant trend is determined according to a positive or negative direction of a voltage difference between two ends of the other one of the X plane and the Y plane;

a two-point coordinate calculation module configured to, based on the quadrant trend, coordinates of the midpoint in the X plane and the Y plane as well as the distances between the two points in the X plane and the Y plane, calculate coordinates of the two points in the X plane and the Y plane; wherein the coordinates of the two points in the X plane are the coordinate of the midpoint in the X plane plus or minus one half of the distance between the two points in the X plane, respectively; the coordinates of the two points in the Y plane are the coordinate of the midpoint in the Y plane plus or minus one half of the distance between the two points in the Y plane, respectively; the plus or minus is determined by coordinate increasing and decreasing relationship of the two points relative to the midpoint, and the coordinate increasing and decreasing relationship is represented by the quadrant trend.

It can be seen from the above, the present invention can obtain the resistance variance ratio of the Y plane relative to the X plane based on voltage detections, and can calculate the inclination angle according to the corresponding relationship between the inclination angle and the resistance variance ratio;

the present invention can also establish the correlated relationship containing the distance between the two points based on the corresponding relationship between the inclination angle and the resistance variance ratio and according to the resistance relationship of the X plane and the Y plane after a two-point touch occurs, thus, taking the detected resistance variance ratio, the first ratio and the second ratio as known variables in the correlated relationship can obtain the specific size of the distance between the two points through calculation according to the correlated relationship.

Further, preferably, the present invention can also judge the quadrant trend of the connecting line between the two points, at this time, based on the quadrant trend, the detected coordinates of the midpoint as well as the calculated distances between the two points, the actual coordinates of the two points can be calculated.

BRIEF DESCRIPTION OF THE DRAWINGS

FIG. 7a and FIG. 7b are schematic diagrams of a voltage change detection mode adopted in one embodiment of the present invention;

FIG. 8a and FIG. 8b are schematic diagrams of another voltage change detection mode adopted in one embodiment of the present invention;

DETAILED DESCRIPTION OF THE EMBODIMENT

In order to make the objectives, technical solutions and advantages of the present invention more clear, the present invention will be described in detail with reference to the accompanying drawings and embodiments.

Figure 1:
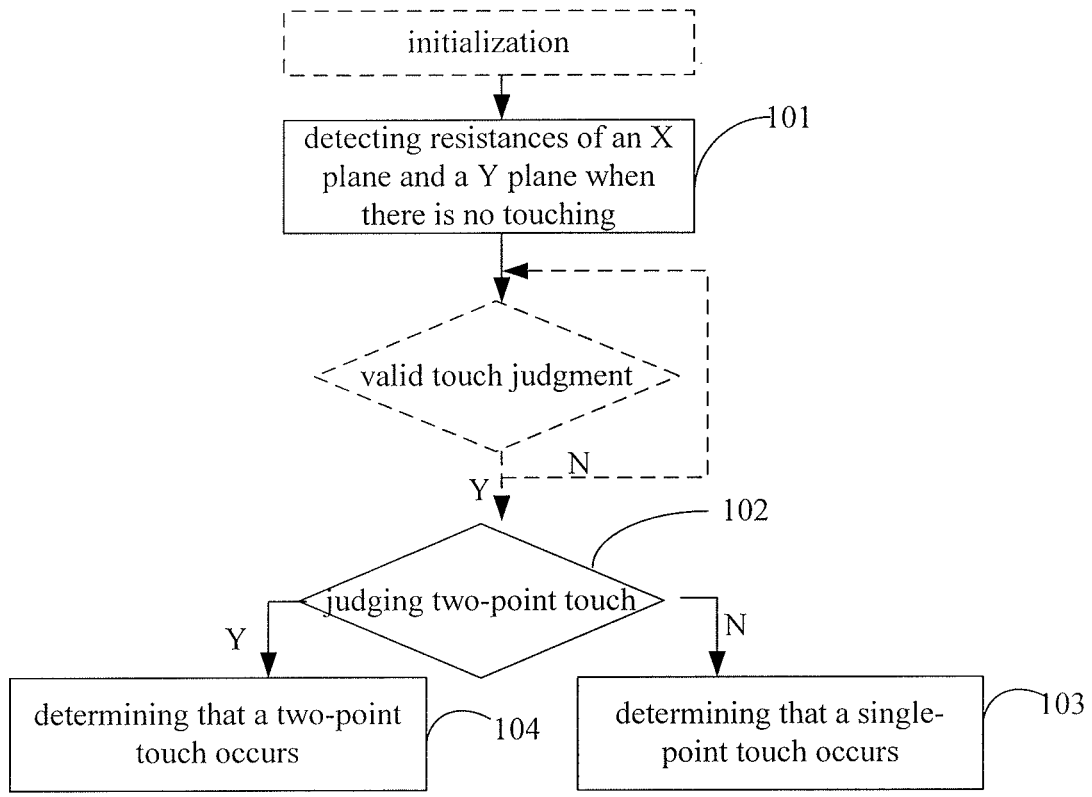
FIG. 1 is an exemplary flow diagram of judging two-point touch or single-point touch according to one embodiment of the present invention.

FIG. 1 is an exemplary flow diagram of judging two-point touch or single-point touch according to one embodiment of the present invention. As shown in FIG. 1, one process for judging two-point touch or single-point touch can include:

Step 101: detecting resistances of an X plane and a Y plane at two ends of the X plane and the Y plane when there is no touching;

Step 102: detecting a resistance variance of a resistance of the X plane and the Y plane at the two ends of the X plane and the Y plane relative to that of the X plane and the Y plane when there is no touching, and judging two-point touch or single-point touch according to the resistance variance.

Step 103: when the resistance variance is smaller than a preset threshold resistance, determining that the touch is a single-point touch. At this moment, coordinates of the dingle point can be detected and calculated.

Step 104: when the resistance variance is greater than the preset threshold resistance, determining that the touch is a two-point touch. At this moment, detection methods according to embodiments of the present invention, for example, shown in FIGS. 2-4, can be used to obtain an inclination angle of a connecting line between the two points, a distance between the two points and coordinates of the two points.

To this, the process for judging two-point touch or single-point touch ends.

Preferably, the process of judging two-point touch or single-point touch can further include: performing an initialization before the step 101; and performing a valid touch judgment after the step before the step 102, and when judging that there is a valid touch, continuing to performing the step 102, otherwise, cyclically performing the valid touch judgment.

Figure 2:
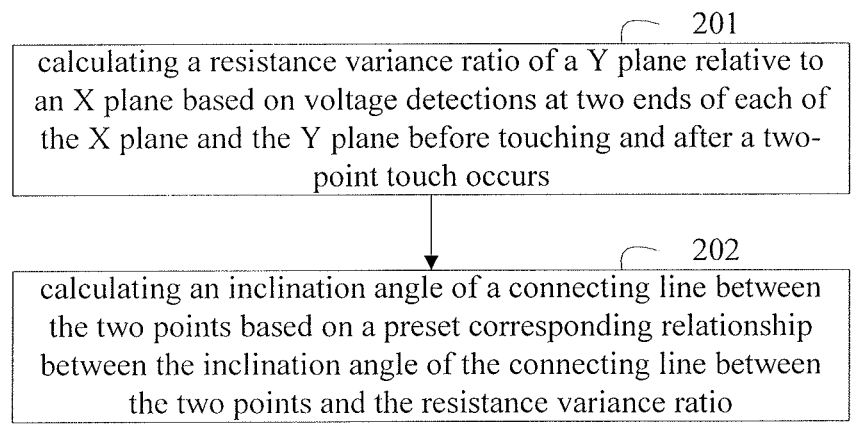
FIG. 2 is an exemplary flow diagram of a resistive touch panel detection method which is suitable for two-point touch according to one embodiment of the present invention.

FIG. 2 is an exemplary flow diagram of a resistive touch panel detection method which is suitable for two-point touch according to one embodiment of the present invention. As shown in FIG. 2, the detection method includes:

Step 201: calculating a resistance variance ratio of a Y plane relative to an X plane based on voltage detections at two ends of each of the X plane and the Y plane before touching and after a two-point touch occurs;

The resistance variance ratio obtained in this step through calculation is proportional to a voltage variance ratio of the Y plane relative to the X plane.

Step 202: calculating an inclination angle of a connecting line between the two points based on a preset corresponding relationship between the inclination angle of the connecting line between the two points and the resistance variance ratio.

To this, the process shown in FIG. 2 ends.

Based on the above process, since the corresponding relationship between the inclination angle and the resistance variance ratio is preset in advance, thus, just detecting voltages which are proportional to resistances can obtain the resistance variance ratio, and then can also obtain the inclination angle of the connecting line between the two points.

Figure 3:
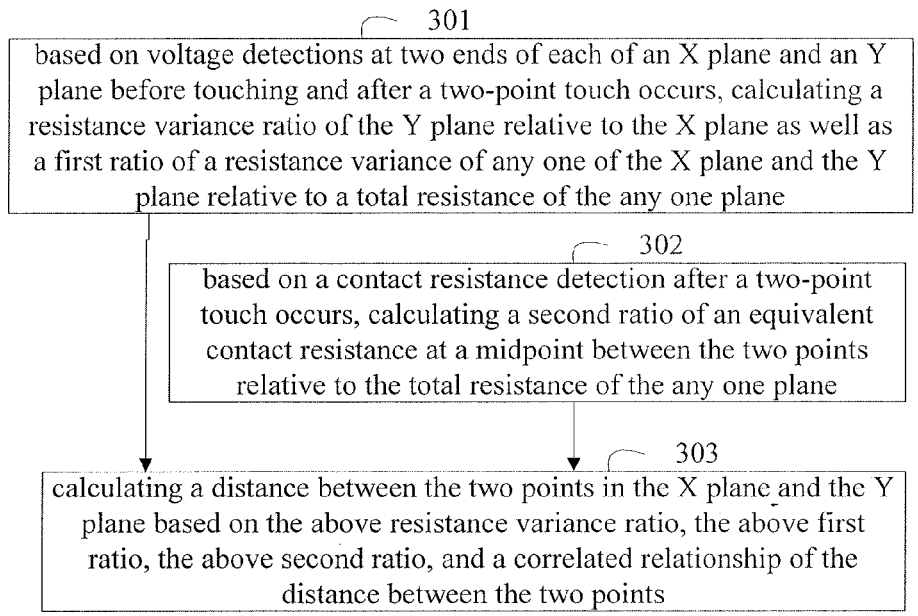
FIG. 3 is another exemplary flow diagram of a resistive touch panel detection method which is suitable for two-point touch according to one embodiment of the present invention.

FIG. 3 is another exemplary flow diagram of a resistive touch panel detection method which is suitable for two-point touch according to one embodiment of the present invention. As shown in FIG. 3, the detection method includes:

Step 301: based on voltage detections at two ends of each of an X plane and an Y plane before touching and after a two-point touch occurs, calculating a resistance variance ratio of the Y plane relative to the X plane as well as a first ratio of a resistance variance of any one of the X plane and the Y plane relative to a total resistance of the any one plane.

The resistance variance ratio obtained in this step through calculation is proportional to the voltage variance ratio of the Y plane relative to the X plane; the first ratio obtained in this step through calculation is proportional to a ratio between a voltage variance of the above any one plane and a voltage of the above any one plane when there is no touching.

Step 302: based on a contact resistance detection after a two-point touch occurs, calculating a second ratio of an equivalent contact resistance at a midpoint between the two points relative to the total resistance of the any one plane.

The contact resistance detection which is a basis of the step, is based on a resistance partial pressure ratio of the contact resistance relative to the above any one plane as well as a coordinate of the midpoint in the above any one plane. The second ratio obtained in this step equals to a product of the above resistance partial pressure ratio and a dividing ratio of the total resistance of the any one plane created by the midpoint.

Step 303: calculating a distance between the two points in the X plane and the Y plane based on the above resistance variance ratio, the above first ratio, the above second ratio, and a correlated relationship of the distance between the two points.

The correlated relationship which is a basis of the this step, can be established in advance, according to resistance relationship of the X plane and the Y plane after a two-point touch occurs and based on the corresponding relationship between the inclination angle and the resistance variance ratio.

To this, the process shown in FIG. 3 ends.

Based on the above process, since the correlated relationship containing the distance between the two points is established based on the corresponding relationship between the inclination angle and the resistance variance ratio and according to the resistance relationship of the X plane and the Y plane after a two-point touch occurs, thus, taking the resistance variance ratio and the first ratio obtained in the step 301 as well as the second ratio obtained in the step 302 as known variables in the correlated relationship can obtain the specific size of the distance between the two points through calculation according to the correlated relationship.

Figure 4:
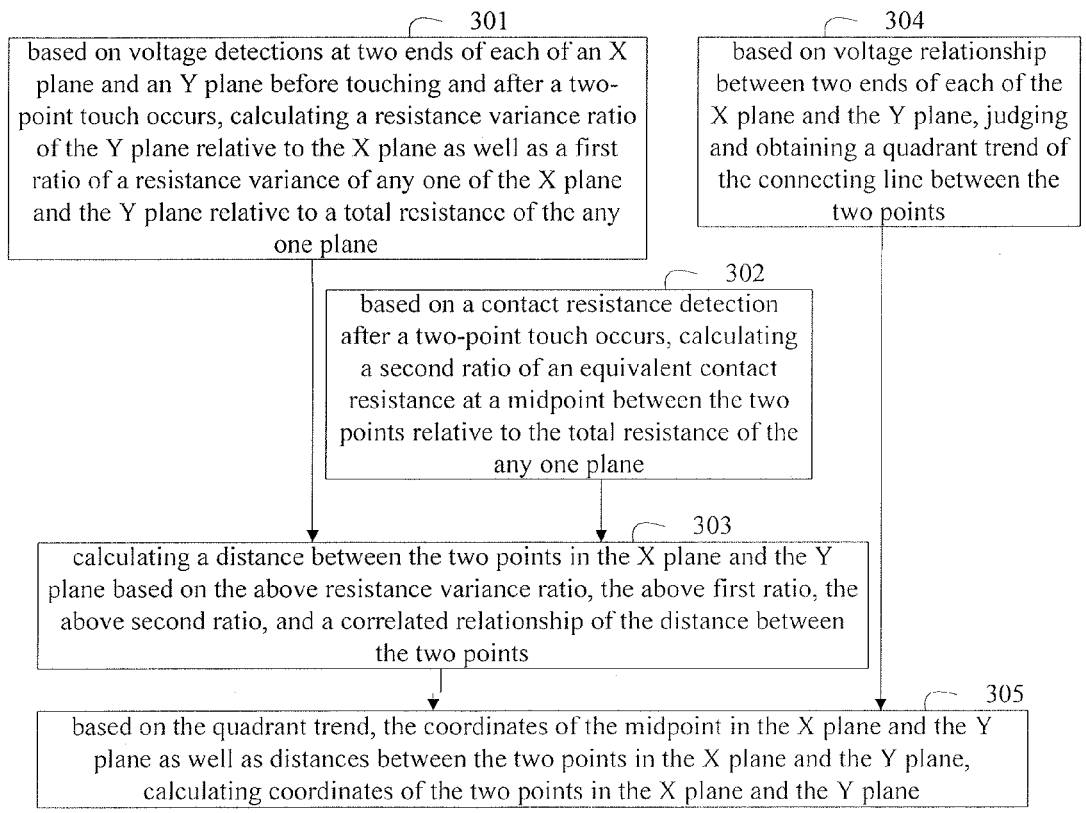
FIG. 4 is an exemplary flow diagram of a resistive touch panel detection method which is suitable for two-point touch and is extended based on the process shown in FIG. 3, according to one embodiment of the present invention.

FIG. 4 is an exemplary flow diagram of a resistive touch panel detection method which is suitable for two-point touch and is extended based on the process shown in FIG. 3, according to one embodiment of the present invention. As shown in FIG. 4, the detection method includes the step 301~303 shown in FIG. 3, and further includes:

Step 304: based on voltage relationship between two ends of each of the X plane and the Y plane, judging and obtaining a quadrant trend of the connecting line between the two points.

After voltage relationship between two ends of one of the X plane and the Y plane is determined, the quadrant trend in this step can be determined according to a positive or negative direction of a voltage difference between two ends of the other one of the X plane and the Y plane.

Step 305: based on the quadrant trend, the coordinates of the midpoint in the X plane and the Y plane as well as distances between the two points in the X plane and the Y plane, calculating coordinates of the two points in the X plane and the Y plane.

The coordinates of the two points in the X plane obtained in this step are the coordinate of the midpoint in the X plane plus or minus one half of the distance between the two points in the X plane, respectively; the coordinates of the two points in the Y plane are the coordinate of the midpoint in the Y plane plus or minus one half of the distance between the two points in the Y plane, respectively. The plus or minus can be determined by coordinate increasing and decreasing relationship of the two points relative to the midpoint, and the coordinate increasing and decreasing relationship is represented by the quadrant trend.

To this, the process shown in FIG. 4 ends.

Based on the above process, since the quadrant trend of the connecting line between the two points can be judged through the step 304, and thus the actual coordinates of the two points can be obtained according to the quadrant trend, the detected coordinates of the midpoint and the calculated distance between the two points.

In order to facilitate understanding of realization principles and specific implementations of each step in the above process, a basic resistance relationship of the X plane and the Y plane after a two-point touch occurs is first described in brief.

Figure 5:
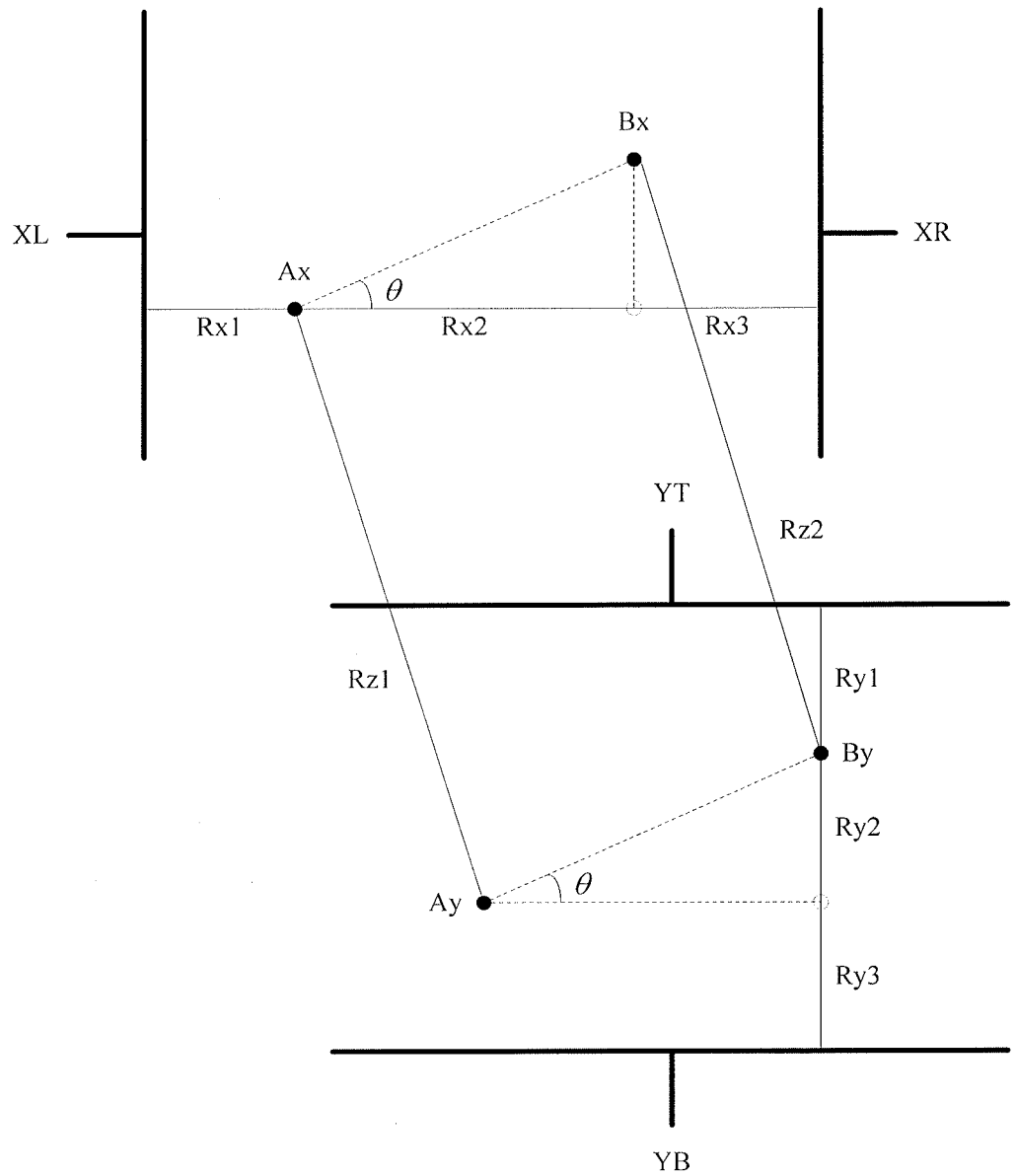
FIG. 5 is a resistance relationship analysis chart provided for two-point touch according to one embodiment of the present invention.

FIG. 5 is a resistance relationship analysis chart provided for two-point touch according to one embodiment of the present invention. As shown in FIG. 5, terminals of the X plane at two ends of an X direction can be XL and XR, respectively; terminals of the Y plane at two ends of a Y direction can be YT and YB, respectively. After two-point touch occurs on a point A and a point B, the A point's position in the X plane is Ax, and the A point's position in the Y plane is Ay; the B point's position in the Y plane is Bx, and the B point's position in the Y plane is By;

the Ax and Bx can divide a total resistance $R_{x,tot}$ of the X plane into three sections including $R_{x1}$ from the XL to the Ax, $R_{x2}$ from the Ax to the Bx, and $R_{x3}$ from the Bx to the XR, that is, $R_{x,tot}=R_{x1}+R_{x2}+R_{x3}$;

the $R_{x2}$ is a resistance between the two points A and B in the X plane, $R_{x2}/R_{x,tot}$ is a normalized distance between the two point in the X plane (which is referred as "distance between the two point in the X plane" hereinafter);

the Ay and By can divide a total resistance $R_{y,tot}$ of the Y plane into three sections including $R_{y1}$ from the YT to the By, $R_{y2}$ from the By to the Ay, and $R_{y3}$ from the Ay to the YB, that is, $R_{x,tot}=R_{y1}+R_{y2}+R_{y3}$;

the $R_{y2}$ is a resistance between the two points A and B in the Y plane, $R_{y2}/R_{y,tot}$ is a normalized distance between the two point in the Y plane (which is referred as "distance between the two point in the Y plane" hereinafter);

and there is also a contact resistance $R_{z1}$ at the touch point A of the X plane and the Y plane formed between the Ax and the Ay; and there is also a contact resistance $R_{z2}$ at the touch point B of the X plane and the Y plane formed between the Bx and the By.

Referring again to FIG. 5, the connecting line between the two points A and B has an inclination angle of $\theta$ with reference to the X direction corresponding to the X plane; meanwhile, there is also known relationship existed between the Y plane and the X plane, including a ratio coefficient $$k_{xy}k_{xy} = \frac{y_{tot}}{x_{tot}}$$

(where, $x_{tot}$ is a total length in the X direction, $y_{tot}$ is a total length in the Y direction) and $$k_{xy}^2 = \frac{R_{y,tot}}{R_{x,tot}}.$$

Thus, based on the above known relationship, the resistance relationship between the two points in the X plane and the Y plane can be obtained and represented as $R_{y2}=k_{xy} \tan \theta R_{x2}$.

Figure 6A:
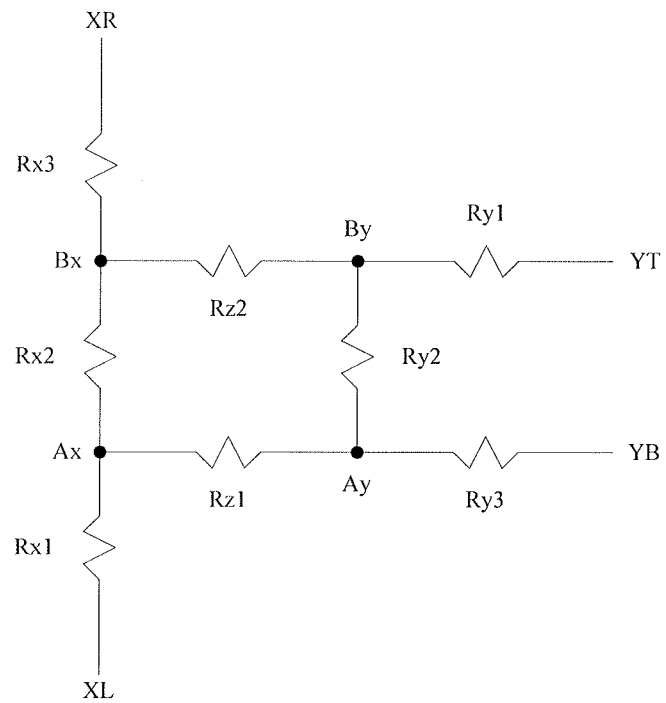
FIG. 6a and FIG. 6b are schematic diagrams of two equivalent resistance networks of resistance relationship shown in FIG. 5.
Figure 6B:
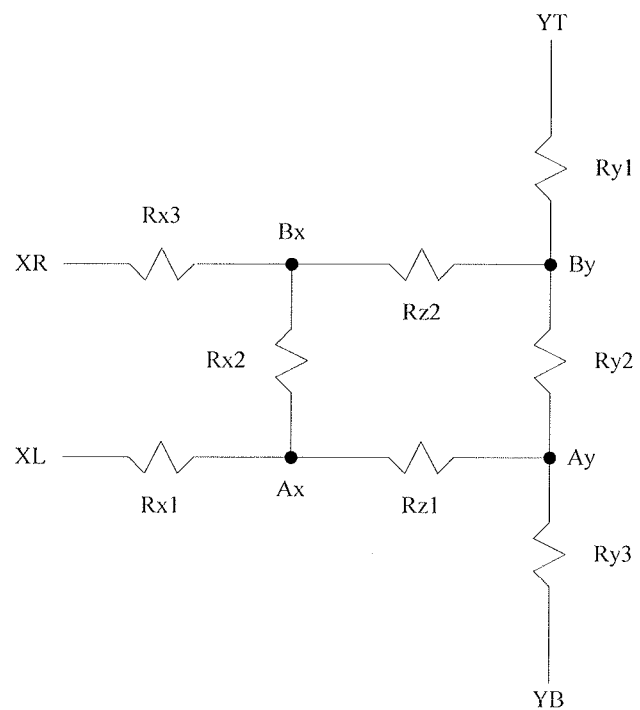

FIG. 6a and FIG. 6b are schematic diagrams of two equivalent resistance networks of the resistance relationship shown in FIG. 5.

As shown in FIG. 6a, after a two-point touch occurs, viewing from the XL terminal of the X plane, in addition to $R_{x1}$, $R_{x2}$ and $R_{x3}$ sequentially connected in series from the XL terminal to the XR terminal, there is also a parallel pathway. The parallel pathway is composed of $R_{z1}$, $R_{y2}$ and $R_{z2}$ sequentially connected in series from an end of $R_{x2}$ where the Ax is located to another end of $R_{x2}$ where the Bx is located. At this moment, the resistance of the X plane is $R_x=R_{x1}+R_{x2}\|(R_{z1}+R_{y2}+R_{z2})+R_{x3}$.

Thus, a reduced variance of the resistance $R_x$ of the X plane after a two-point touch occurs relative to the total resistance $R_{x,tot}$ of the X plane when there is no touching can be $\Delta R_x = R_{x,tot}-R_x=R_{x2}-R_{x2}\|(R_{z1}+R_{y2}+R_{z2})$. The "$\|$" appearing in the present invention represents parallel relationship.

If adding $R_{y2}=k_{xy} \tan \theta R_{x2}$ into $\Delta R_x = R_{x,tot}-R_x=R_{x2}-R_{x2}\|(R_{z1}+R_{y2}+R_{z2})$, then obtaining:

$$\Delta R_x = \frac{R_{x2}^2}{R_{z1}+R_{z2}+(1+k_{xy}\tan\theta)R_{x2}}.$$

As shown in FIG. 6b, similarly, it can be obtained that a reduced variance of the resistance $R_y$ of the Y plane after a two-point touch occurs relative to the total resistance $R_{y,tot}$ of the Y plane when there is no touching can be:

$$\Delta R_y = \frac{R_{y2}^2}{R_{z1}+R_{z2}+[1+1/(k_{xy}\tan\theta)]R_{y2}}.$$

And then, the corresponding relationship between the inclination angle $\theta$ of the connecting line between the two points and the resistance variance ratio $\Delta R_y/\Delta R_X$ can be obtained as:

$$k_{xy} \tan \theta = \sqrt{\Delta R_y/\Delta R_x}.$$

In the following, realization principles and preferred implementations of each step in the above processes as shown in FIGS. 1-4, will be described in detail with reference to the basic resistance relationship shown in FIG. 5, FIG. 6a and FIG. 6b.

1) With Respect to the Step 101 and the Step 102 in the Process as Shown in FIG. 1, the Step 201 in the Process as Shown in FIG. 2 and the Step 301 in the Processes Shown in FIGS. 3-4.

The step 101 and step 102, the step 201 and the step 301 require obtaining degree of resistance change, which in essence can be understood as using voltage changes to detect the resistance changes. The resistance change detected in the step 101 and the step 102 is specific size of the resistance variance; while the resistance change detected in the step 201 is not specific size of the resistance variance but is the aforementioned resistance variance ratio $\Delta R_y/\Delta R_X$ which is related to the resistance change. Similarly, the resistance change detected in the step 301 is not specific size of the resistance variance but is the aforementioned resistance variance $\Delta R_y/\Delta R_X$ which is related to the resistance change as well as the aforementioned first ratio $\Delta R_x/\Delta R_{x,tot}$ or $\Delta R_y/\Delta R_{y,tot}$.

For the step 101 and the step 102, the step 201 as well as the step 301, embodiments of the present invention provides two detection modes: one is current excitation mode and the other is voltage excitation mode.

FIG. 7a and FIG. 7b are schematic diagrams of a voltage change detection mode adopted in one embodiment of the present invention. The current excitation mode refers to FIG. 7a and FIG. 7b.

As shown in FIG. 7a, the current excitation mode is applied to the X plane to make a current source Ib inflow from the XL terminal and outflow from the XR terminal.

Then, a voltage ADCIN_X of the XL terminal in the X plane connected to the current source Ib is the detected voltage of the X plane and is proportional to the resistance between the XL terminal and the XR terminal.

Thus, if the resistance between the XL terminal and the XR terminal is changed from $R_{x,tot}$ to $R_x$ and produces the resistance variance $\Delta R_x$, it can show a voltage variance $\Delta V_{res,x}$ which is proportional to the resistance variance $\Delta R_x$. The voltage variance $\Delta V_{res,x}$ is the voltage variance of the X plane before touching and after a two-point touch occurs, and is $$\Delta V_{res,x} = I_b \Delta R_x = I_b \frac{R_{x2}^2}{R_{z1} + R_{z2} + (1 + k_{xy}\tan\theta)R_{x2}}.$$

As shown in FIG. 7b, similarly with the X plane, the voltage variance of the Y plane before touching and after a two-point touch occurs is $$\Delta V_{res,y} = I_b \Delta R_y = I_b \frac{R_{y2}^2}{R_{z1} + R_{z2} + [1 + 1/(k_{xy}\tan\theta)]R_{y2}}.$$

From this, $\Delta R_y/\Delta R_x = \Delta V_{res,y}/\Delta V_{res,x}$, $\Delta R_x/\Delta R_{x,tot} = \Delta V_{res,x}/\Delta V_{res,x\_tot}$ and $\Delta R_y/\Delta R_{y,tot} = \Delta V_{res,y}/\Delta V_{res,y\_tot}$ can be obtained, where $V_{res,x\_tot}$ is the voltage of the X plane when there is no touching, and $V_{res,y\_tot}$ is the voltage of the Y plane when there is no touching.

Thus, if current excitation is applied to the X plane and the Y plane, respectively, to achieve voltage detections, the resistance variance ratio $\Delta R_y/\Delta R_x$ obtained in the step 201 and the step 301 through calculation equals to the voltage variance ratio $\Delta V_{res,y}/\Delta V_{res,x}$ of the Y plane relative to the X plane; the first ratio $\Delta V_{res,x}/V_{res,x\_tot}$ obtained in the step 301 through calculation equals to the ratio $\Delta V_{res,x}/V_{res,x\_tot}$ between the voltage variance of the X plane and the voltage of the X plane when there is no touching; $\Delta R_y/\Delta R_{y,tot}$ equals to the ratio $\Delta V_{res,y}/V_{res,y\_tot}$ between the voltage variance of the Y plane and the voltage of the Y plane when there is no touching.

Further, the voltage $V_{res,x\_tot}$ of the X plane when there is no touching is a voltage corresponding to the resistance of the X plane detected in the step 101; the aforementioned voltage variance $\Delta V_{res,x}$ is a voltage variance corresponding to the resistance variance detected in the step 102. The voltage $V_{res,y\_tot}$ of the Y plane when there is no touching is a voltage corresponding to the resistance of the Y plane detected in the step 101; the aforementioned voltage variance $\Delta V_{res,y}$ is a voltage variance corresponding to the resistance variance of the Y plane which is detected in the step 102 and used to judge two-point touch or single-point touch by comparing with a threshold voltage.

FIG. 8a and FIG. 8b are schematic diagrams of another voltage change detection mode adopted in one embodiment of the present invention. The voltage excitation mode refers to FIG. 8a and FIG. 8b.

As shown in FIG. 8a, when applying the voltage excitation mode to the X plane, an external resistor R11 can be connected to the XL terminal in series; an external resistor R21 can be connected to the XR terminal in series; a positive voltage excitation $V_{bp}$ can be applied to an end of the external resistor R11, and the end of the external resistor R11 is not connected with the XL terminal; a negative voltage excitation $V_{bn}$ can be applied to an end of the external resistor R21, and the end of the external resistor R21 is not connected with the XR terminal.

A voltage difference between the voltage $V_{XL}$ of the XL terminal and the voltage $V_{XR}$ of the XR terminal, i.e., $V_{XL} - V_{XR}$, is the detected voltage of the X plane.

After a two-point touch occurs, the voltage difference $V_{XL} - V_{XR}$ meets $$\frac{V_{XL} - V_{XR}}{V_{bp} - V_{bn}} = \frac{R_x}{R_{11} + R_{21} + R_x}.$$

In consideration of $R_{11} + R_{21} + R_x \geq \Delta R_x$, so the following derivative relationship can be met:

$$\frac{d\left(\frac{V_{XL} - V_{XR}}{V_{bp} - V_{bn}}\right)}{d(R_x)} = \frac{R_{11} + R_{21}}{(R_{11} + R_{21} + R_x)^2} \approx \frac{R_{11} + R_{21}}{(R_{11} + R_{21} + R_{x,tot})^2};$$

Using the above derivative relationship, the voltage variance $\Delta(V_{XL} - V_{XR})$ of the voltage difference $V_{XL} - V_{XR}$ can be obtained. The voltage variance $\Delta(V_{XL} - V_{XR})$ is the voltage variance of the X plane before touching and after a two-point touch occurs, $$\Delta(V_{XL} - V_{XR}) \approx \frac{R_{11} + R_{21}}{(R_{11} + R_{21} + R_{x,tot})^2}(V_{bp} - V_{bn})\Delta R_x.$$

As shown in FIG. 8b, similarly with the X plane, when applying the voltage excitation mode to the Y plane, an external resistor R12 can be connected to the YT terminal in series; an external resistor R22 can be connected to the YB terminal in series; the positive voltage excitation $V_{bp}$ can be applied to an end of the external resistor R12, and the end of the external resistor R12 is not connected with the YT terminal; the negative voltage excitation $V_{bn}$ can be applied to an end of the external resistor R22, and the end of the external resistor R22 is not connected with the YB terminal. A voltage difference ADCIN_Y between the voltage $V_{YT}$ of the YT terminal and the voltage $V_{YB}$ of the YB terminal, i.e., $V_{YT} - V_{YB}$, is the detected voltage of the Y plane.

After a two-point touch occurs, the voltage difference $V_{XL} - V_{XR}$ meets $$\frac{V_{YT} - V_{YB}}{V_{bp} - V_{bn}} = \frac{R_y}{R_{12} + R_{22} + R_y}.$$

Similarly, using the above derivative relationship, the voltage variance of the Y plane before touching and after a two-point touch occurs, $$\Delta(V_{YT} - V_{YB}) \approx \frac{R_{12} + R_{22}}{(R_{12} + R_{22} + R_{y,tot})^2}(V_{bp} - V_{bn})\Delta R_y.$$

Thus, as an example, the first ratio takes the X plane as a reference (any one plane can be the X plane) and can be represented as $\Delta R_x/\Delta R_{x,tot}$, then it can be obtained:

$$\Delta R_y/\Delta R_x = \frac{R_{11}+R_{21}}{R_{12}+R_{22}}\left(\frac{R_{12}+R_{22}+R_{y,tot}}{R_{11}+R_{21}+R_{x,tot}}\right)^2 \frac{\Delta(V_{YT}-V_{YB})}{\Delta(V_{XL}-V_{XR})};$$

and $$\Delta R_x/\Delta R_{x,tot} = \frac{R_{11}+R_{21}+R_{x,tot}}{R_{11}+R_{21}}\frac{\Delta(V_{XL}-V_{XR})}{\Delta(V_{XL}-V_{XR})_{tot}},$$

where $(V_{XL}-V_{XR})_{tot}$ is a voltage of the X plane when there is no touching and meets $$\frac{(V_{XL}-V_{XR})_{tot}}{V_{bp}-V_{bn}} = \frac{R_{y,tot}}{R_{12}+R_{22}+R_{y,tot}}.$$

In the expressions of the above example in which the first ratio takes the X plane as a reference and can be represented as $$\Delta R_x/R_{x,tot}, \frac{R_{11}+R_{21}}{R_{12}+R_{22}}\left(\frac{R_{12}+R_{22}+R_{y,tot}}{R_{11}+R_{21}+R_{x,tot}}\right)^2$$

can be considered as a first scaling factor between the resistance variance ratio $\Delta R_y/\Delta R_x$ and the voltage variance ratio of the Y plane relative to the X plane $$\frac{\Delta(V_{YT}-V_{YB})}{\Delta(V_{XL}-V_{XR})}; \frac{R_{11}+R_{21}+R_{x,tot}}{R_{11}+R_{21}}$$

can be considered as a second scaling factor between the first ratio $$\frac{\Delta R_x}{R_{x,tot}}$$

and the ratio $$\frac{\Delta(V_{XL}-V_{XR})}{(V_{XL}-V_{XR})_{tot}}$$

of the voltage variance of the X plane relative to the voltage of the X plane when there is no touching.

Further, the voltage difference $V_{XL}-V_{XR}$ of the X plane when there is no touching is a voltage corresponding to the resistance of the X plane detected in the step 101; a specific value of the aforementioned voltage variance $\Delta(V_{XL}-V_{XR})$ is a voltage variance corresponding to the resistance variance detected in the step 102. The voltage difference $V_{YT}-V_{YB}$ of the Y plane when there is no touching is a voltage corresponding to the resistance of the Y plane detected in the step 101; a specific value of the aforementioned voltage variance $\Delta(V_{YT}-V_{YB})$ is a voltage variance corresponding to the resistance variance of the Y plane which is detected in the step 102.

It should be noted, in FIG. 8a and FIG. 8b, two ends of each of the X plane and the Y plane are connected with the external resistors, respectively; in actual applications, it is also possible that only one end of each of the X plane and the Y plane is connected with the external resistor.

2) With Respect to the Step 302 Shown in FIG. 3 and FIG. 4.

The correlated relationship which can be used to calculate the distance between the two touch points A and B in the following, is established according to the resistance relationship of the X plane and the Y plane after a two-point touch occurs. The resistance relationship inevitably involves the contact resistance $R_{z1}$ at the touch point A and the contact resistance $R_{z2}$ at the touch point B.

But, considering that the contact resistance $R_{z1}$ at the touch point A and the contact resistance $R_{z2}$ at the touch point B are difficult to be detected, thus, the step 302 in essence is to detect a ratio related to the equivalent contact resistance $R_{touch}$ at the midpoint between the two points and take the ratio as a known variable for solving the correlated relationship.

As mentioned above, in order to obtain the equivalent contact resistance $R_{touch}$ at the midpoint between the two points, it needs to detect the resistance partial pressure ratio between $R_{z1}$ or $R_{z2}$ of any one of the touch points A and B and the total resistance $R_{x,tot}$ or $R_{y,tot}$ of any one, of the X plane and the Y plane, as well as the coordinates of the midpoint between the two points A and B in any one of the X plane and the Y plane.

Figure 9:
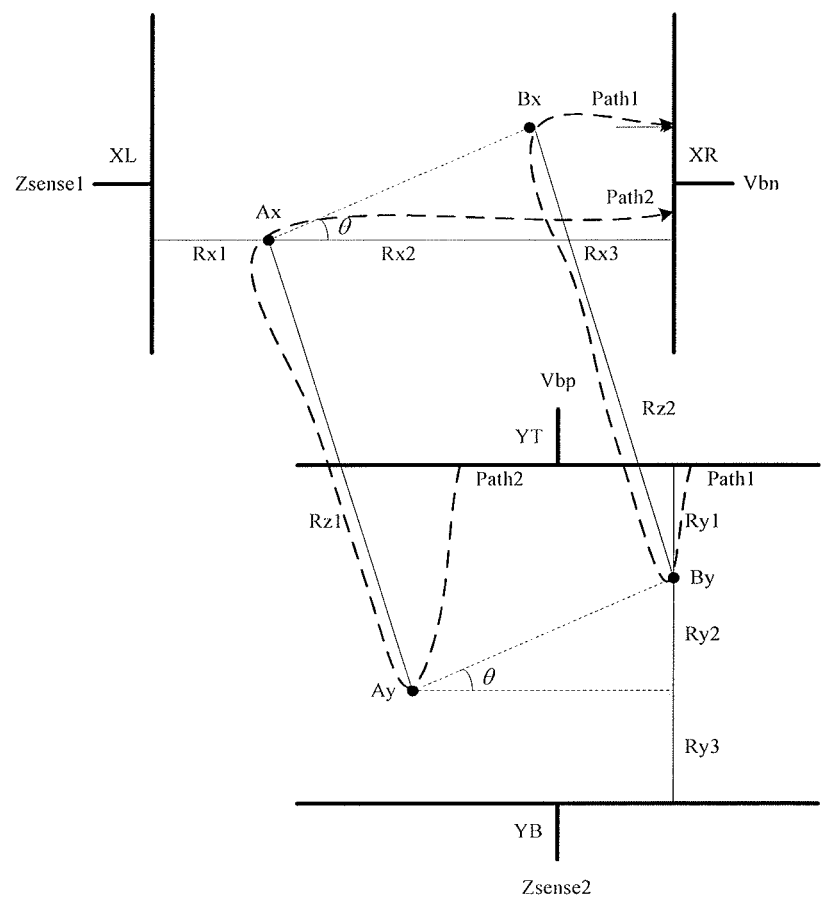
FIG. 9 is a current flow analysis chart which is generated based on the resistance relationship shown in FIG. 5 according to one embodiment of the present invention.
Figure 10:
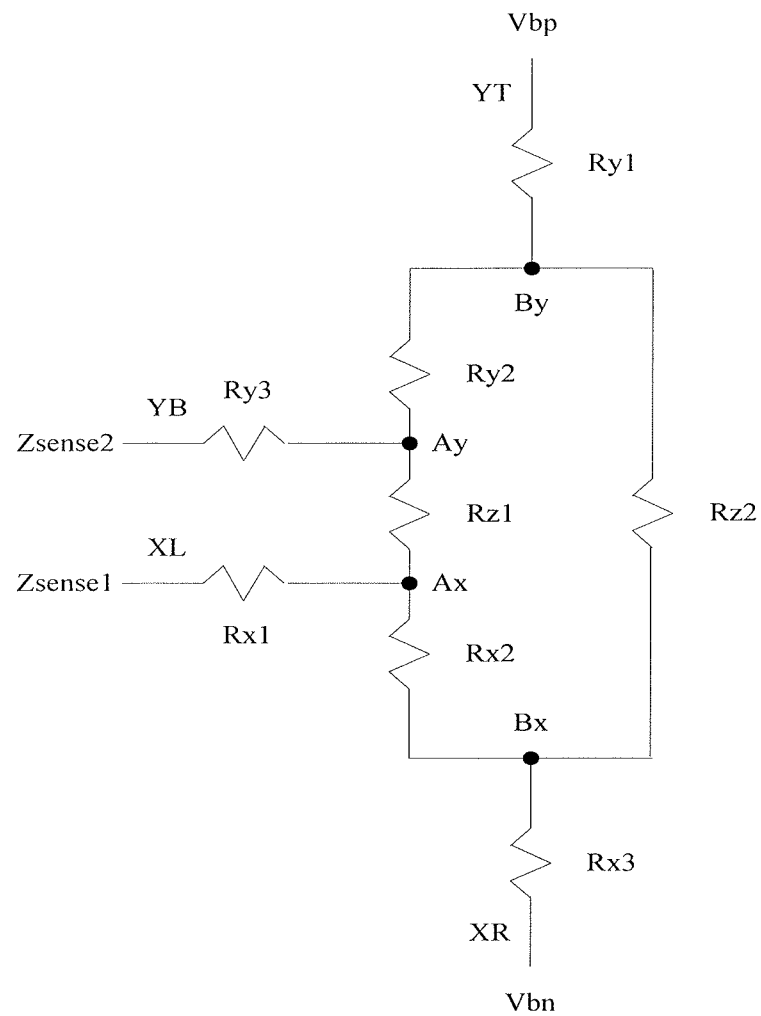
FIG. 10 is a schematic diagram of a partial pressure relation detection mode adopted in one embodiment of the present invention.

FIG. 9 is a current flow analysis chart which is generated based on the resistance relationship shown in FIG. 5 according to one embodiment of the present invention. FIG. 10 is a schematic diagram of a partial pressure relation detection mode adopted in one embodiment of the present invention. The realization principles and implementations of detecting the above resistance partial pressure ratio are shown in FIG. 9 and FIG. 10.

As shown in FIG. 9 and FIG. 10, taking detecting a resistance partial pressure ratio between the contact resistance $R_{z1}$ of the touch point A and a segment of resistance in the X plane from the XR terminal to Ax as an example, the positive voltage excitation $V_{bp}$ can be applied to the YT terminal of the Y plane; the negative voltage excitation $V_{bn}$ can be applied to the XR terminal of the X plane; at this moment, the current flows in the X plane and the Y plane along two paths, i.e., Path1 and Path2 shown in FIG. 9 with dashed curve arrows;

resistances in the Path1 are a resistance $R_{y1}$ from the YT terminal to By, a $R_{z2}$ from By to Bx, $R_{x3}$ from Bx to the XR terminal in turns; resistances in the Path2 are $R_{y1}$ and $R_{y2}$ from the YT terminal to Ay, $R_{z1}$ from Ay to Ax, $R_{x2}$ and $R_{x3}$ from Ax to the XR terminal;

further, the XL terminal is taken as a first detection point Zsense1, and the YB terminal is taken as a second detection point Zsense2.

$D(z_{sen1})$ is used to represent a digital voltage ratio of a voltage value detected at the first detection point Zsense1 relative to $V_{bp}-V_{bn}$; and $D(z_{sen2})$ is used to represent a digital voltage ratio of a voltage value detected at the second detection point Zsense2 relative to $V_{bp}-V_{bn}$.

Then, the obtained $$\frac{D(z_{sen2}) - D(z_{sen1})}{D(z_{sen1})} = D(z_{sen2})/D(z_{sen1}) - 1$$

is the resistance partial pressure ratio between the contact resistance $R_{z1}$ of the touch point A and the segment of resistance in the X plane from the XR terminal to Ax.

Based on the mode given in FIG. 9 and FIG. 10, one skilled in the art can derive other possible resistance partial pressure ratios and derive corresponding manners of applying a voltage excitation, and those will not be listed one by one.

It can be seen, the detection of the resistance partial pressure ratio in the step 302, can be realized by applying voltage excitation on an end of any one plane of the X plane and the Y plane as well as an end of the other one plane of the X plane and the Y plane, and taking the other end of the any one plane and the other end of the other one plane as voltage detection points. The resulting resistance partial pressure ratio is the resistance partial pressure ratio of the contact resistance $R_{z1}$ or $R_{z2}$ relative to one segment of resistance in the any one plane; the one segment of resistance is from an end of the any one plane to the point A corresponding to the contact resistance $R_{z1}$ or the point B corresponding to the contact resistance $R_{z2}$.

Figure 11A:
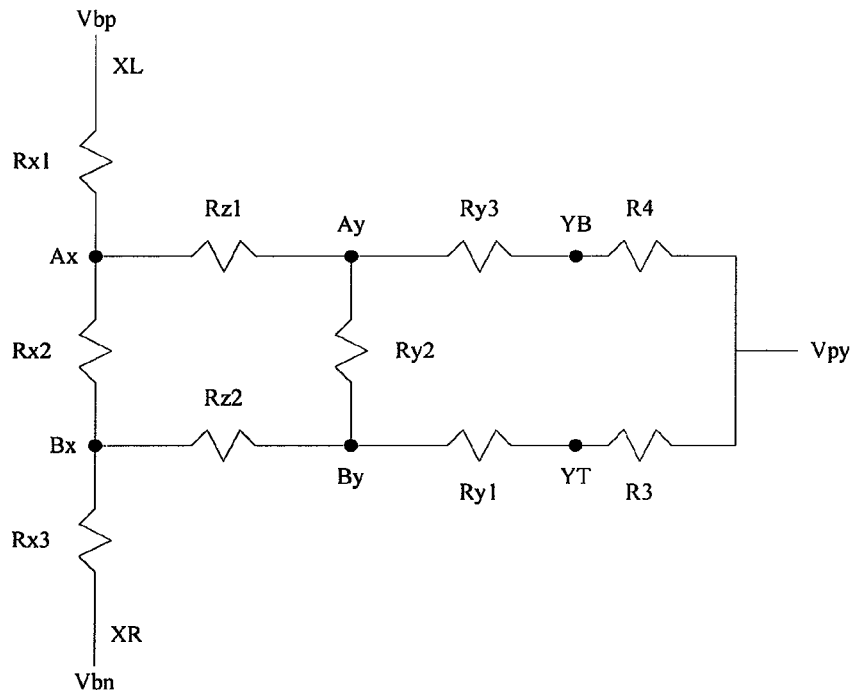
FIG. 11a and FIG. 11b are schematic diagrams of a midpoint coordinate detection mode adopted in one embodiment of the present invention.
Figure 11B:
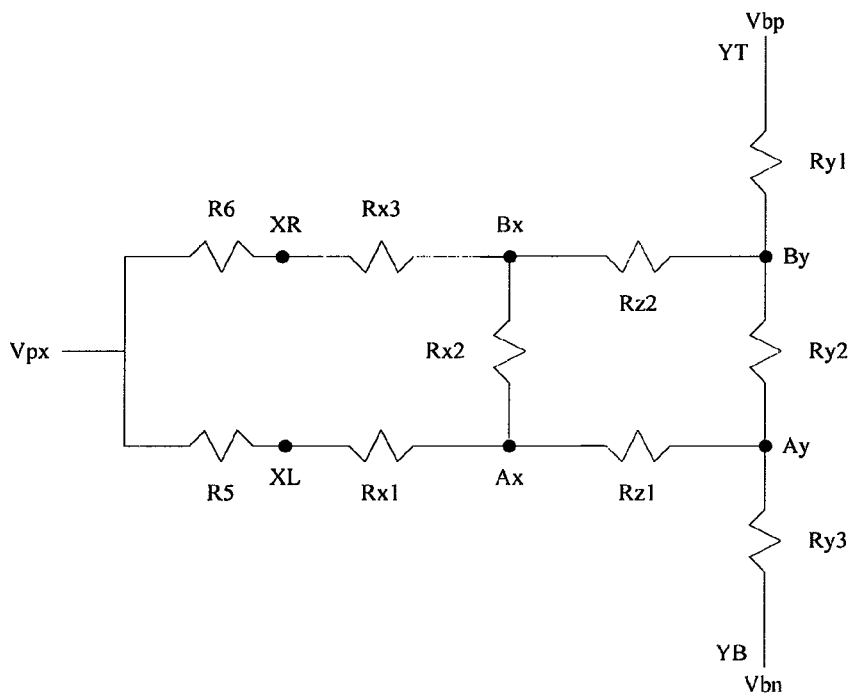

FIG. 11a and FIG. 11b are schematic diagrams of a midpoint coordinate detection mode adopted in one embodiment of the present invention. The realization principles and implementations of detecting coordinates of the midpoint between the two points A and B are shown in FIG. 11a and FIG. 11b.

As shown in FIG. 11a, the positive voltage excitation $V_{bp}$ can be applied to the XL terminal of the X plane; the negative voltage excitation $V_{bn}$ can be applied to the XR terminal of the X plane; an external resistor R3 can be connected to the YT terminal of the Y plane in series; an external resistor R4 can be connected to the YB terminal of the Y plane in series; the external resistors R3, R4 have a same resistance value which is at least 5 times more than the total resistance $R_{y,tot}$ of the Y plane. An end of the external resistor R3 which is not connected with the YT terminal and an end of the external resistor R4 which is not connected with the YB terminal are shorted. Since $R_{y1}$, $R_{y3}$ can be negligible compared to the external resistors R3 and R4, if ignoring differences between the contact resistances $R_{z1}$ and $R_{z2}$, and assuming $R_{z1}=R_{z2}$, then a voltage Vpy of a short contact Xmid is actually the voltage of the midpoint of $R_{x2}$ obtained through voltage dividing. $D(x_{mid})$ is used to represent a digital voltage ratio between the detected voltage Vpy of the short contact point Xmid and $V_{bp}-V_{bn}$. $D(x_{mid})$ is equivalent to an X direction coordinate of the midpoint in the X plane, or can be understood as a dividing ratio of the total resistance $R_{x,tot}$ of the X plane created by the midpoint.

As shown in FIG. 11ab, similarly with the X plane, a detected voltage Vpx of the short point Ymid is equivalent to a Y direction coordinate of the midpoint in the Y plane, or can be understood as a dividing ratio of the total resistance $R_{y,tot}$ of the Y plane created by the midpoint.

As seen from the above, the detection of the midpoint's coordinate in the X plane can be realized by applying a voltage excitation to the two terminals of the X plane and via the voltage of the short contact point obtained through connecting the two terminals of the Y plane via the external resistors having the same resistance value;

the detection the midpoint's coordinate in the Y plane can be realized by applying a voltage excitation to the two terminals of the Y plane and via the voltage of the short contact point obtained through connecting the two terminals of the X plane via the external resistors having the same resistance value.

Since this embodiment of the present invention takes detecting the resistance partial pressure ratio between the contact resistance $R_{z1}$ of the touch point A and the segment of resistance in the X plane from the XR terminal to Ax as an example, thus, for this example, in the process of calculating the second ratio $$\frac{R_{touch}}{R_{x,tot}}$$

of the equivalent contact resistance $R_{touch}$ at the midpoint between the two points relative to the total resistance $R_{x,tot}$ of the X plane, it only requires the coordinate $D(x_{mid})$ of the midpoint of the X direction in the X plane.

Of course, if a resistance partial pressure ratio relative to the Y plane is used in actual applications, then in the process of calculating the second ratio $$\frac{R_{touch}}{R_{y,tot}}$$

of the equivalent contact resistance $R_{touch}$ relative to the total resistance $R_{y,tot}$ of the Y plane, it only requires the coordinate $D(y_{mid})$ of the midpoint of the Y direction in the Y plane.

Still taking detecting the resistance partial pressure ratio between the contact resistance $R_{z1}$ of the touch point A and the segment of resistance in the X plane from the XR terminal to Ax as an example, the second ratio $$\frac{R_{touch}}{R_{x,tot}}$$

calculated in the step 202 can be represented by a product of the resistance partial pressure ratio $D(z_2)/D(z_1)-1$ and the dividing ratio $D(x_{mid})$ of the total resistance $R_{x,tot}$ of the X plane created by the midpoint:

$$\frac{R_{touch}}{R_{x,tot}} = D(x_{mid})[D(z_2)/D(z_1) - 1].$$

In addition, supplementary explanation is that when a single point touch occurs, the short detection mode shown in FIG. 11a and FIG. 11b can also be applied to the single-point coordinate detection for the single point touch.

3) With Respect to the Step 303 in the Process Shown in FIG. 3 and FIG. 4.

Through the previous step 301 and step 302, the following known variables can be obtained: the resistance variance ratio $\Delta R_y/\Delta R_x$, the aforementioned first ratio $\Delta R_x/R_{x,tot}$ and second ratio $$\frac{R_{touch}}{R_{x,tot}}.$$

Then, the step 303 only needs to perform solution according to the correlated relationship.

One embodiment of the present invention provides a variety of forms of the correlated relationship on which the step 303 is based. The variety of forms will be described separately hereinafter with an example, in which the first ratio takes the X plane as a reference and is represented as $\Delta R_x/R_{x,tot}$, the second ratio takes the X plane as a reference (i.e., obtained for a resistance partial pressure ratio relative to the X plane) and is represented as $$\frac{R_{touch}}{R_{x,tot}}.$$

3.1) First Form of the Correlated Relationship

The following expressions have been obtained when describing the basic resistance relationship in the above based on FIG. 5 as well as FIG. 6a and FIG. 6b:

$$\Delta R_x = \frac{R_{x2}^2}{R_{z1} + R_{z2} + (1 + k_{xy}\tan\theta)R_{x2}} \quad \text{Formula 1}$$

$$\Delta R_y = \frac{R_{y2}^2}{R_{z1} + R_{z2} + [1 + 1/(k_{xy}\tan\theta)]R_{y2}} \quad \text{Formula 2}$$

Further, the following two expressions can also be obtained from FIG. 10 and FIG. 11a, respectively, $$D(z_{sen2})/D(z_{sen1}) - 1 = \frac{R_{z1}R_{z2}}{(1 + k_{xy}\tan\theta)R_{x2}R_{x3} + R_{z2}(R_{x2} + R_{x3}) + R_{z1}R_{x3}};$$

and $$D(x_{mid}) = \frac{R_{x3} + \frac{1}{2}R_{x2}\|(R_{z1} + R_{z2} + R_{y2})}{R_{x1} + R_{x2}\|(R_{z1} + R_{z2} + R_{y2}) + R_{x3}}.$$

In consideration of simplifying theoretical analysis, the difference between the contact resistances $R_{z1}$ and $R_{z2}$ can first be negligible, the actual contact resistances $R_{z1}$ and $R_{z2}$ can be uniformly expressed as $R_z$.

Meanwhile, adding a relational expression $$R_{x3} = D(x_{mid})R_{x,tot} - \frac{1}{2}R_{x2}$$

of $R_{x3}$ and $R_{x2}$ into the expression of $D(z_2)/D(z_1)-1$ as well as the expression of $D(x_{mid})$, the following expression can be obtained:

$$R_{touch} = \frac{R_z^2}{[(1 + k_{xy}\tan\theta)]\left[1 - \frac{1}{2D(x_{mid})}\frac{R_{x2}}{R_{x,tot}}\right]R_{x2} + 2R_z} \quad \text{Formula 3}$$

The following equations can be obtained through the resistance relationship $R_{y2}=k_{xy}\tan\theta\, R_{x2}$ between the two points in the X plane and the Y plane as well as the above formula 1, formula 2 and formula 3:

$$R_{touch} = \frac{R_z^2}{[(1 + k_{xy}\tan\theta)]\left[1 - \frac{1}{2D(x_{mid})}\frac{R_{x2}}{R_{x,tot}}\right]R_{x2} + 2R_z}$$

$$\Delta R_x = \frac{R_{x2}^2}{2R_z + (1 + k_{xy}\tan\theta)R_{x2}}$$

$$\Delta R_y = \frac{R_{y2}^2}{2R_z + [1 + 1/(k_{xy}\tan\theta)]R_{y2}}$$

$$k_{xy}\tan\theta = \frac{R_{y2}}{R_{x2}}$$

The following correlated relationship can be obtained based on the corresponding relationship $k_{xy}\tan\theta=\sqrt{\Delta R_y/\Delta R_x}$ between the inclination angle $\theta$ of the connecting line between the two points and the resistance variance ratio $\Delta R_y/\Delta R_x$, and by transforming the above equations according to the definition of the distance between the two points, letting $$x_{2,ratio} = \frac{R_{x2}}{R_{x,tot}}$$

represent the distance between two points in the X plane, letting $$y_{2,ratio} = \frac{R_{y2}}{R_{y,tot}}$$

represent the distance between two points in the Y plane and letting $$z_{ratio} = \frac{R_z}{R_{x,tot}}$$

represent a ratio of a contact resistance at each touch point relative to the total resistance of the X plane:

$$X_{2,ratio} = \frac{\left(1 + \sqrt{\Delta R_y/\Delta R_x}\right)\frac{\Delta R_x}{R_{x,tot}} + \sqrt{\left(1 + \sqrt{\Delta R_y/\Delta R_x}\right)^2\left(\frac{\Delta R_x}{R_{x,tot}}\right)^2 + 8\frac{\Delta R_x}{R_{x,tot}}Z_{ratio}}}{2}$$

$$Z_{2,ratio} = \frac{R_{touch}}{R_{x,tot}} + \sqrt{\left(\frac{R_{touch}}{R_{x,tot}}\right)^2 + \frac{R_{touch}}{R_{x,tot}}\left(1 + \sqrt{\Delta R_y/\Delta R_x}\right)\left[1 - \frac{X_{2,ratio}}{2D(X_{mid})}\right]X_{2,ratio}}$$

$$k_{xy}\tan\theta = \sqrt{\Delta R_y/\Delta R_x}$$

$$y_{2,ratio} = x_{2,ratio}\tan\theta/k_{xy}$$

For this Correlated Relationship:

The previous two expressions include only two unknown quantities: $x_{2,ratio}$ and $z_{ratio}$, and thus can be solved simultaneously. However, in consideration that the previous two expressions are complicated and are difficult to be solved directly, thus, in actual applications, an initial value can be assigned to $z_{ratio}$ in advance, and the previous two expressions can be solved through an iteration method;

The third expression includes two known quantities including the resistance variance ratio $\Delta R_y/\Delta R_x$ and the resistance value ratio coefficient $k_{xy}$, and only one unknown quantity of the inclination angel $\theta$, and thus can be directly solved independently;

After the previous three expressions are solved, the fourth expression includes two known quantities including $x_{2,ratio}$ and the inclination angle $\theta$, and only one unknown quantity of $y_{2,ratio}$, thus can be solved.

Furthermore, confirmed by simulation and experimental data, the impact of uniformly expressing the actual contact resistances $R_{z1}$ and $R_{z2}$ as $R_z$ on the accuracy of the final distances $x_{2,ratio}$ and $y_{2,ratio}$ between the two points is in a certain range of allowable error, and can be negligible.

3.2) Second Form of the Correlated Relationship

In order to reduce the computation difficulty of the first form, the Intermediate parameter $$Z_{ratio} = \frac{R_z}{R_{x,tot}}$$

can be simplified and $R_z$ can be simplified as $R_z = 2R_{touch}$.

The above correlated relationship can be expressed as:

$$X_{2,ratio} = \frac{\left(1 + \sqrt{\Delta R_y/\Delta R_x}\right)\frac{\Delta R_x}{R_{x,tot}} + \sqrt{\left(1 + \sqrt{\Delta R_y/\Delta R_x}\right)^2 \left(\frac{\Delta R_x}{R_{x,tot}}\right)^2 + 8\frac{\Delta R_x}{R_{x,tot}}Z_{ratio}}}{2}$$

$$Z_{ratio} = 2\frac{R_{touch}}{R_{x,tot}}$$

$$k_{xy}\tan\theta = \sqrt{\Delta R_y/\Delta R_x}$$

$$y_{2,ratio} = x_{2,ratio}\tan\theta/k_{xy}$$

Confirmed by simulation and experimental data, the impact of simplifying $R_z$ into $R_z = 2R_{touch}$ on the accuracy of the final distances $x_{2,ratio}$ and $y_{2,ratio}$ between the two points is in a certain range of allowable error, and can be negligible.

Since the embodiments of the present invention have given the resistance relationship between the two points in the X plane and the Y plane, $R_{y2} = k_{xy} \tan\theta R_{x2}$, and thus provide the corresponding relationship between the inclination angle $\theta$ of the connecting line between the two points and the resistance variance ratio $\Delta R_y/\Delta R_x$, $k_{xy}\tan\theta = \sqrt{\Delta R_y/\Delta R_x}$, and analyze the resistance value relationship of the X plane and the Y plane after a two-point touch occurs, thus, based on the toms of the correlated relationship, one skilled in the art can also extend other forms, which will not be listed here one by one.

Although all the above forms of the correlated relationship refers to situations in which the first ratio takes the X plane as a reference and can be represented as $\Delta R_x/R_{x,tot}$, the second ratio takes the X plane as a reference (i.e., obtained for a resistance partial pressure ratio relative to the X plane) and is represented as $$\frac{R_{touch}}{R_{x,tot}},$$

i.e., the above forms takes the X plane as a reference. However, one skilled in the art can obtain a variety of forms of correlated relationship referring to situations in which the first ratio takes the Y plane as a reference and can be represented as $\Delta R_y/R_{y,tot}$, the second ratio takes the Y plane as a reference (i.e., obtained for a resistance partial pressure ratio relative to the Y plane) and is represented as $$\frac{R_{touch}}{R_{y,tot}},$$

through the equivalent substitution; and those will not be listed one by one.

More preferably, one skilled in the art can simultaneously set a correlated relationship which takes the X plane as a reference and a correlated relationship which takes the Y plane as a reference; in actual applications, correlated relationships based on the two references can be switched to be used in the step 303.

For example, when the connecting line between is nearly parallel to the X direction ($\theta$ is smaller than 45 degrees), the distance $y_{2,ratio}$ between the two points in the Y plane is too small and thus is difficult to be solved. At this moment, first using the correlated relationship which takes the X plane as the reference to solve the distance $x_{2,ratio}$ between the two points in the X plane, and then obtaining the distance $y_{2,ratio}$ between the two points in the Y plane through tan $\theta$ transformation. On the contrary, when the connecting line between is nearly parallel to the Y direction ($\theta$ is greater than 45 degrees), the distance $x_{2,ratio}$ between the two points in the X plane is too small and thus is difficult to be solved. At this moment, first using the correlated relationship which takes the Y plane as the reference to solve the distance $y_{2,ratio}$ between the two points in the Y plane, and then obtaining the distance $x_{2,ratio}$ between the two points in the X plane through tan $\theta$ transformation.

4) With Respect to the Step 304 in the Process Shown in FIG. 4.

The so-called quadrant trend refers to an inclination direction of the two touch points. In addition to two extreme circumstances of being parallel to the X direction and being parallel to the Y direction, there are a quadrant trend between a first quadrant orientation and a third quadrant orientation, and a quadrant trend between a second quadrant orientation and a fourth quadrant orientation.

For this, just after voltage relationship between two ends of one of the X plane and the Y plane is determined, a positive or negative direction of a voltage difference between two ends of the other one of the X plane and the Y plane can be used to determine whether the quadrant trend is the quadrant trend between the first quadrant orientation and the third quadrant orientation or the quadrant trend between the second quadrant orientation and the fourth quadrant orientation.

Figure 12A:
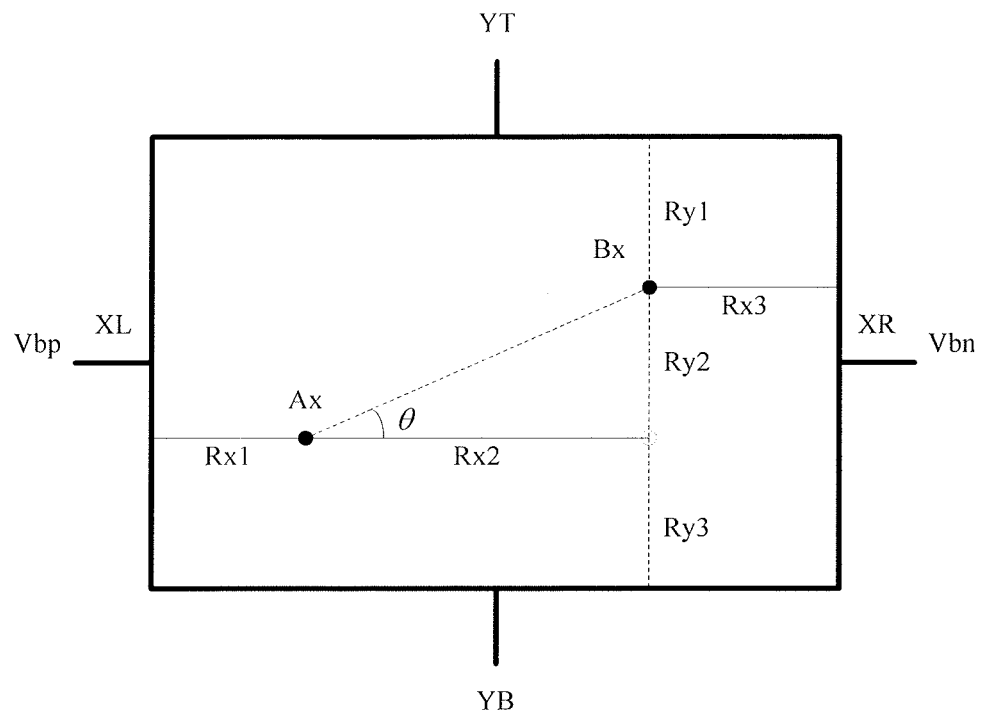
FIG. 12a and FIG. 12b are principle schematic diagrams of judging a quadrant trend according to one embodiment of the present invention.
Figure 12B:
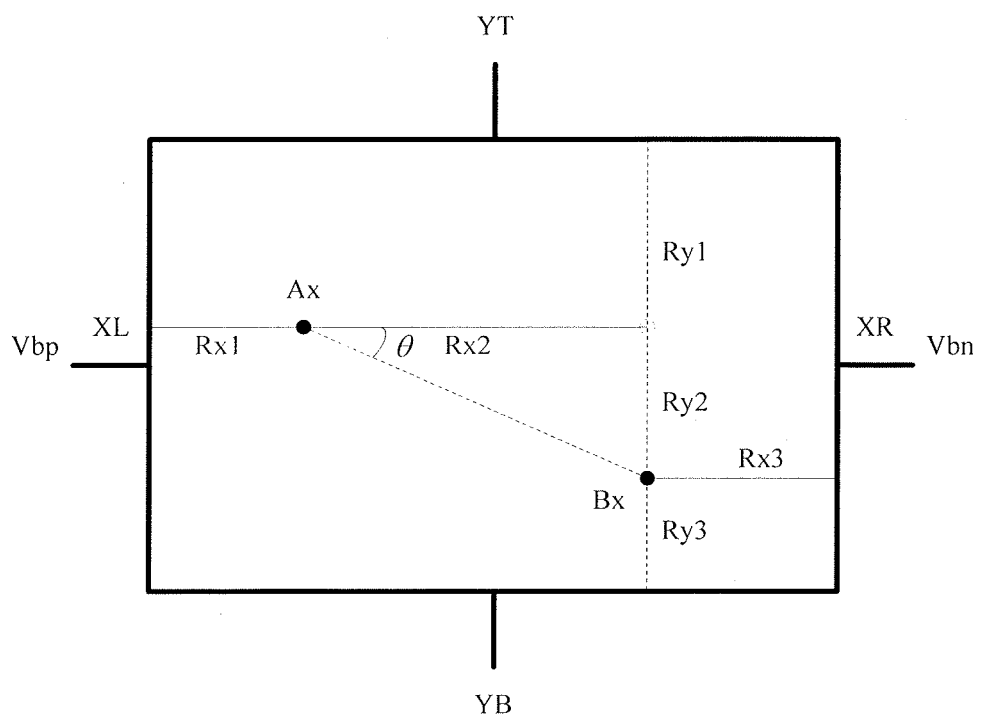

FIG. 12*a* and FIG. 12*b* are principle schematic diagrams of judging a quadrant trend according to one embodiment of the present invention.

The situation shown in FIG. 12*a* is the quadrant trend between the first quadrant orientation and the third quadrant orientation. First referring to FIG. 12*a*, a positive voltage excitation $V_{bp}$ can be applied to an XL terminal of the X plane, a negative voltage excitation $V_{bn}$ can be applied to an XR terminal of the X plane. Since a YT terminal of the Y plane is closer to the negative voltage excitation $V_{bn}$ comparing with a YB terminal in the Y plane, and the YB terminal is closer to the positive voltage excitation $V_{bp}$ comparing with the YT terminal, thus VYT−VYB<0. Then, for the situation shown in FIG. 12a, according to VYT−VYB<0, it can be determined that the quadrant trend of the connecting line between the two points is between the first quadrant orientation and the third quadrant orientation.

The situation shown in FIG. 12b is the quadrant trend between the second quadrant orientation and the fourth quadrant orientation. Referring again to FIG. 12b, similarly, according to VYT−VYB>0, it can be determined that the quadrant trend of the connecting line between the two points is between the second quadrant orientation and the fourth quadrant orientation.

Of course, if the voltages of the two ends of the X plane are same, it indicates one extreme circumstance of being parallel to the X direction. If the voltages of the two ends of the Y plane are same, it indicates the other extreme circumstance of being parallel to the Y direction.

The foregoing is detailed description of detection methods of the embodiments of the present invention. It can be seen from the above description, in the embodiments of the present invention, the manner of judging whether a two-point touch occurs shown in FIG. 1 as well as the detection methods shown in FIGS. 2-4 can be realized with the help of a current excitation mode and a voltage excitation mode. Thus, one embodiment of the present invention also provides a hardware circuit which supports current excitation and voltage excitation.

Figure 13:
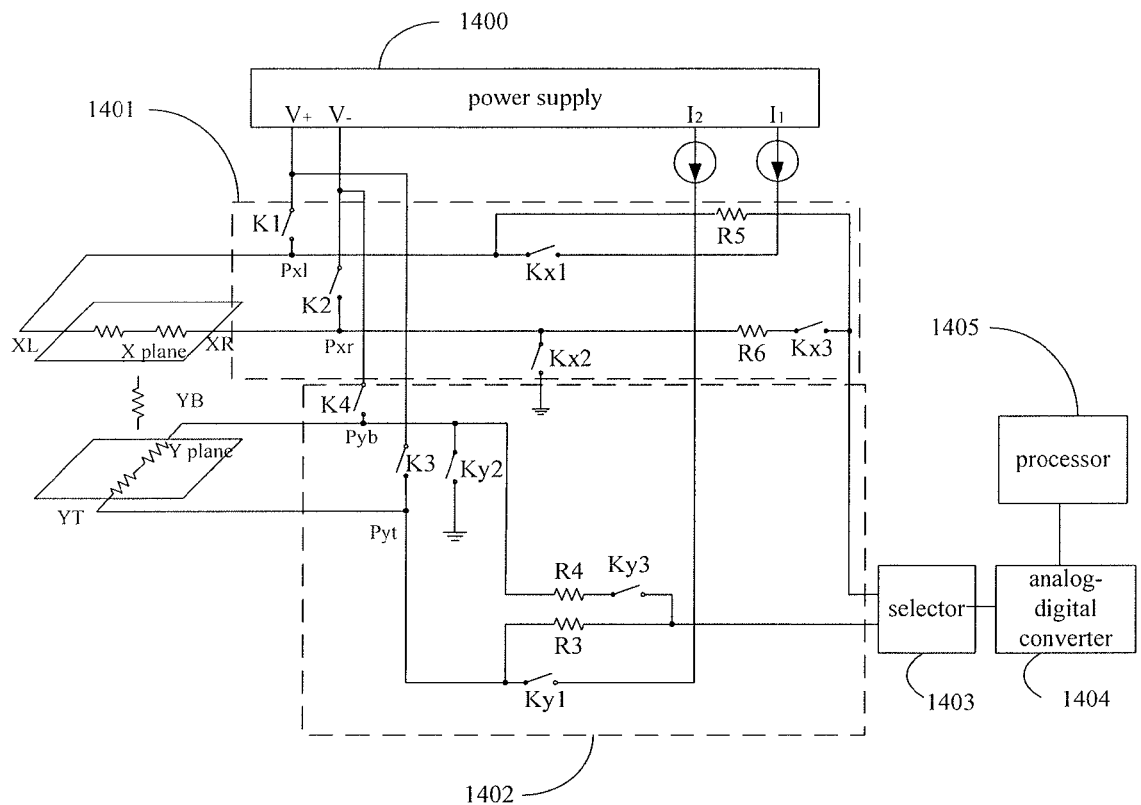
FIG. 13 is an exemplary diagram of a circuit which can support the detection modes shown in FIG. 7a and FIG. 7b, FIG. 11a and FIG. 11b according to one embodiment of the present invention.

FIG. 13 is an exemplary diagram of a circuit which can support the detection modes shown in FIG. 7a and FIG. 7b, FIG. 11a and FIG. 11b according to one embodiment of the present invention. As shown in FIG. 13, the circuit includes an X plane detection circuit 1401, a Y plane detection circuit 1402, a selector 1403, an analog-digital converter 1404, and a processor 1405.

A current input of the X plane detection circuit 1401 is connected with a first current output I1 of an external power supply 1400. A positive detection terminal of the X plane detection circuit 1401 is connected with an edge XL of an end of an X plane of a touch panel at a connecting point which is a node Pxl. A negative detection terminal of the X plane detection circuit 1401 is connected with an edge XR of another opposite parallel end of the X plane at a connecting point which is a node Pxr. A positive voltage input of the X plane detection circuit 1401 is connected with a forward voltage output V+ of the power supply 1400. A negative voltage input of the X plane detection circuit 1401 is connected with a reverse voltage output V− of the power supply 1400.

The X plane detection circuit 1401 includes a switch Kx1, a switch Kx2, a switch Kx3, a switch K1, a switch K2, a resistor R5 and a resistor R6. An end of the switch Kx1 is used as the current input of the X plane detection circuit 1401 and is connected with the first current output I1 of the power supply 1400. The other end of the switch Kx1 is used as the positive detection terminal of the X plane detection circuit 1401 and is connected with the edge XL of the end of the X plane of the touch panel (the connecting point is the node Pxl). An end of the resistor R5 is connected with the other end of the switch Kx1 which is used as the positive detection terminal of the X plane detection circuit 1401. The other end of the R5 is used as an output of the X plane detection circuit 1401. An end of the switch Kx2 is used as the negative detection terminal of the X plane detection circuit 1401 and is connected with the edge XR of another opposite parallel end of the X plane (the connecting point is the node Pxr). The other end of the switch Kx2 is grounded. An end of the resister R6 is connected with the end of the switch Kx2 which is used as the negative detection terminal of the X plane detection circuit 1401. The other end of the resister R6 is connected with an end of the switch Kx3. The other end of the switch Kx3 is connected with the other end of the R5 which is used as the output of the X plane detection circuit 1401. An end of the switch K1 is used as the positive voltage input of the X plane detection circuit 1401 and is connected with the forward voltage output V+ of the power supply 1400. The other end of the switch K1 is connected with the other end of the switch Kx1 which is used as the positive detection terminal of the X plane detection circuit 1401. An end of the switch K2 is used as the negative voltage input of the X plane detection circuit 1401 and is connected with the reverse voltage output V− of the power supply 1400. The other end of the switch K2 is connected with the end of the switch Kx2 which is used as the negative detection terminal of the X plane detection circuit 1401.

A current input of the Y plane detection circuit 1402 is connected with a second current output I2 of the external power supply 1400. A positive detection terminal of the Y plane detection circuit 1402 is connected with an edge YT of an end of a Y plane at a connecting point which is a node Pyt. A negative detection terminal of the Y plane detection circuit 1402 is connected with an edge YB of another opposite parallel end of the Y plane at a connecting point which is a node Pyb. A positive voltage input of the Y plane detection circuit 1402 is connected with the forward voltage output V+ of the power supply 1400. A negative voltage input of the Y plane detection circuit 1402 is connected with the reverse voltage output V− of the power supply 1400.

The Y plane detection circuit 1402 includes a switch K3, a switch K4, a switch Ky1, a switch Ky2, a switch Ky3, a resistor R3 and a resistor R4. An end of the switch Ky1 is used as the current input of the Y plane detection circuit 1402 and is connected with the second current output I2 of the power supply 1400. The other end of the switch Ky1 is used as the positive detection terminal of the Y plane detection circuit 1402 and is connected with the edge YT of the end of the Y plane of the touch panel (the connecting point is the node Pyt). An end of the resistor R3 is connected with the other end of the switch Ky1 which is used as the positive detection terminal of the Y plane detection circuit 1402. The other end of the R3 is used as an output of the Y plane detection circuit 1402. An end of the switch Ky2 is used as the negative detection terminal of the Y plane detection circuit 1402 and is connected with the edge YB of another opposite parallel end of the Y plane (the connecting point is the node Pyb). The other end of the switch Ky2 is grounded. An end of the resister R4 is connected with the end of the switch Ky2 which is used as the negative detection terminal of the Y plane detection circuit 1402. The other end of the resistor R4 is connected with an end of the switch Ky3. The other end of the switch Ky3 is connected with the other end of the R4 which is used as the output of the Y plane detection circuit 1402. An end of the switch K3 is used as the positive voltage input of the Y plane detection circuit 1402 and is connected with the forward voltage output V+ of the power supply 1400. The other end of the switch K3 is connected with the other end of the switch Ky1 which is used as the positive detection terminal of the Y plane detection circuit 1402. An end of the switch K4 is used as the negative voltage input of the Y plane detection circuit 1402 and is connected with the reverse voltage output V− of the power supply 1400. The other end of the switch K4 is connected with the end of the switch Ky2 which is used as the negative detection terminal of the Y plane detection circuit 1402.

A first input of the selector 1403 is connected with the output of the X plane detection circuit 1401. A second input of the selector 1403 is connected with the output of the Y plane detection circuit 1402.

An input of the analog-digital converter 1404 is connected with an output of the selector 1403.

An input of the processor 1405 is connected with an output of the analog-digital converter 1404. The processor 1405 can perform the above processes as shown in FIGS. 1-4.

If the circuit is required to support the current excitation mode as shown in FIG. 7a and FIG. 7b, then, when the power supply 1400 applies a current excitation on the X plane according to the detection mode as shown in FIG. 7a, the switch Kx1 and the switch Kx2 in the X plane detection circuit 1401 are closed and other switches are open, to make the X plane detection circuit 1401 detect change of the resistance of the X plane and output an analog voltage signal obtained by detecting the X plane;

when the power supply 1400 applies a current excitation on the Y plane according to the detection mode as shown in FIG. 7b, the switch Ky1 and the switch Ky2 in the Y plane detection circuit 1402 are closed and other switches are open, to make the Y plane detection circuit 1402 detect change of the resistance of the Y plane and output an analog voltage signal obtained by detecting the Y plane;

The first input of the selector 1403 receives the analog voltage signal obtained by detecting the X plane; the second input of the selector 1403 receives the analog voltage signal obtained by detecting the Y plane; the output of the selector 1403 is configured to selectively output the analog voltage signal obtained by detecting the X plane or the analog voltage signal obtained by detecting the Y plane;

the analog-digital converter 1404 converts the analog voltage signal obtained by detecting the X plane and output by the selector 1403 into a digital voltage signal obtained by detecting the X plane, and converts the analog voltage signal obtained by detecting the Y plane into a digital voltage signal obtained by detecting the Y plane;

the processor 1405 judges whether a single-point touch or a two-point touch occurs according to the above process as shown in FIG. 4, and performs calculations according to corresponding steps in the processes as shown in FIGS. 1-4.

If the circuit is required to support the voltage excitation mode as shown in FIG. 11a and FIG. 11b, then, when the power supply 1400 applies a voltage excitation on the X plane and shorts the Y plane according to the mode as shown in FIG. 11a and FIG. 12a, the switch K1 and the switch K2 in the X plane detection circuit 1401 as well as the switch Ky3 in the Y plane detection circuit 1402 are closed; the output of the Y plane detection circuit 1402 is the short point of the resistor R3 and the resistor R4 which have the same resistance value, and outputs an analog voltage signal corresponding to the midpoint or the single point in the X plane;

when the power supply 1400 applies a voltage excitation on the Y plane and shorts the X plane according to the mode as shown in FIG. 11b and FIG. 12b, the switch K3 and the switch K4 in the Y plane detection circuit 1402 as well as the switch Kx3 in the X plane detection circuit 1401 are closed; the output of the X plane detection circuit 1401 is the short point of the resistor R5 and the resistor R6 which have the same resistance value, and outputs an analog voltage signal corresponding to the midpoint or the single point in the Y plane;

the first input of the selector 1403 receives the analog voltage signal corresponding to the midpoint or the single point in the X plane; the second input of the selector 1403 receives the analog voltage signal corresponding to the midpoint or the single point in the Y plane; the output of the selector 1403 is configured to selectively output the analog voltage signal corresponding to the midpoint or the single point in the X plane or the analog voltage signal corresponding to the midpoint or the single point in the Y plane.

the analog-digital converter 1404 converts the analog voltage signal corresponding to the midpoint or the single point in the X plane into a digital voltage signal corresponding to the midpoint or the single point in the X plane, and converts the analog voltage signal corresponding to the midpoint or the single point in the Y plane into a digital voltage signal corresponding to the midpoint or the single point in the Y plane;

the processor 1405 performs calculations according to corresponding steps in the processes as shown in FIGS. 2-4.

Of course, the circuit shown in FIG. 13 is just an example for supporting the current excitation mode shown in FIG. 7a and FIG. 7b as well as the voltage excitation mode shown in FIG. 11a and FIG. 11b. In actual applications, if requiring to replace the current excitation detection mode shown in FIG. 7a and FIG. 7b with the voltage excitation detection mode shown in FIG. 8a and FIG. 8b, the first current output I1 and the second current output I2 of the external power supply 1400 can be eliminated, and positions of the switch Kx1 and the switch Kx2 in the X plane detection circuit 1401 as well as the switch Ky1 and the switch Ky2 in the Y plane detection circuit 1402 are set to be conducted. In addition, it also needs to add the resistors R11 and R21 shown in FIG. 8a as well as corresponding control switches into the X plane detection circuit 1401, and add the resistors R12 and R22 shown in FIG. 8b as well as corresponding control switches into the Y plane detection circuit 1402. This will not be repeated here.

Based on the same principles as those of the detection methods mentioned above, one embodiment of the present invention also provides a corresponding detection apparatus.

Figure 14:
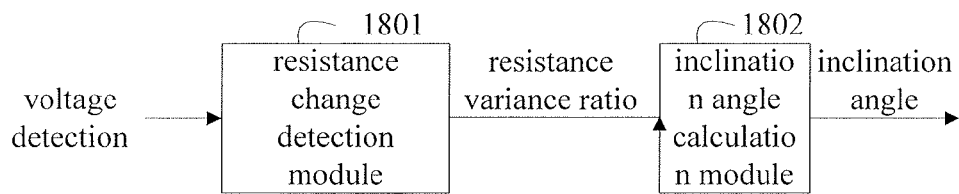
FIG. 14 is an exemplary diagram of a resistive touch panel detection apparatus which is suitable for two-point touch according to one embodiment of the present invention.

FIG. 14 is an exemplary diagram of a resistive touch panel detection apparatus which is suitable for two-point touch according to one embodiment of the present invention. As shown in FIG. 14, the detection apparatus includes:

a resistance change detection module 1801 configured to, based on voltage detections at two ends of each of the X plane and the Y plane before touching and after a two-point touch occurs, calculate a resistance variance ratio of the Y plane relative to the X plane; the resistance variance ratio obtained by the resistance change detection module 1801 through calculation being proportional to a voltage variance ratio of the Y plane relative to the X plane;

an inclination angle calculation module 1802 configured to calculate an inclination angle of a connecting line between the two points based on a preset corresponding relationship between the inclination angle of the connecting line between the two points and the resistance variance ratio.

It can be seen from the above detection apparatus, since the corresponding relationship between the inclination angle and the resistance variance ratio is preset in advance, thus, so long as the resistance change detection module 1801 detects voltages which are proportional to resistances, the resistance variance ratio can be obtained, and then the inclination angle of the connecting line between the two points can be obtained by the resistance change detection module 1801.

Realization principles and implementations of the resistance change detection module 1801 are the same as those of the detection method, for example, the step 101 in the process shown in FIG. 1.

Further, the corresponding relationship between the inclination angle of the connecting line between the two points and the resistance variance ratio which the inclination angle calculation module 1802 is based on, can be represented as $k_{xy} \tan \theta = \sqrt{\Delta R_y / \Delta R_x}$.

Figure 15:
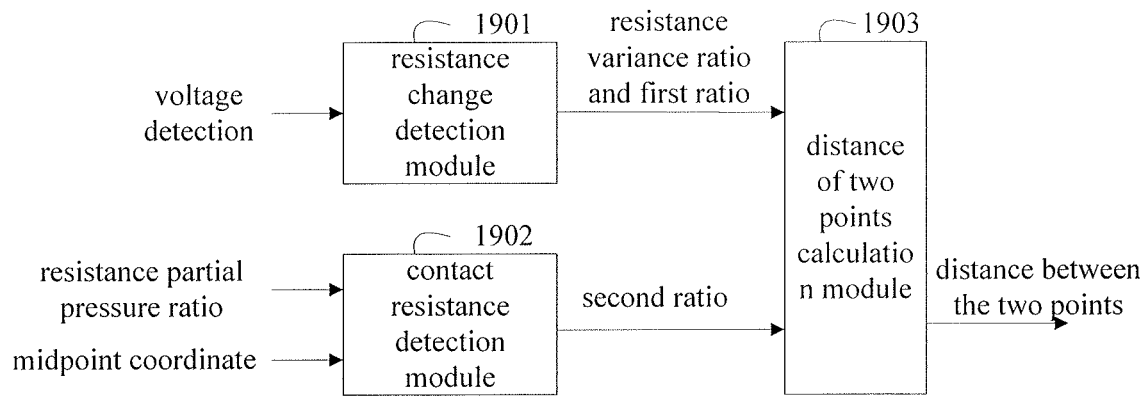
FIG. 15 is an exemplary diagram of a resistive touch panel detection apparatus which is suitable for two-point touch according to another embodiment of the present invention.

FIG. 15 is an exemplary diagram of a resistive touch panel detection apparatus which is suitable for two-point touch according to another embodiment of the present invention. As shown in FIG. 15, the detection apparatus includes:

a resistance change detection module 1901 configured to, based on voltage detections at two ends of each of an X plane and an Y plane before touching and after a two-point touch occurs, calculate a resistance variance ratio of the Y plane relative to the X plane as well as a first ratio of a resistance variance of any one of the X plane and the Y plane relative to a total resistance of the any one plane; the resistance variance ratio obtained by the resistance change detection module 1901 through calculation being proportional to a voltage variance ratio of the Y plane relative to the X plane, and the first ratio being proportional to a ratio between a voltage variance of the above any one plane and a voltage of the above any one plane when there is no touching;

a contact resistance detection module 1902 configured to, based on a contact resistance detection after a two-point touch occurs, calculate a second ratio of an equivalent contact resistance at a midpoint between the two points relative to the total resistance of the any one plane; the detection of the midpoint's coordinate in the X plane, which the contact resistance detection module 1902 is based on, being realized by applying a voltage excitation to the two terminals of the X plane and via a voltage of a short contact point obtained through connecting the two terminals of the Y plane via external resistors having the same resistance value; the detection the midpoint's coordinate in the Y plane, which the contact resistance detection module 1902 is based on, being realized by applying a voltage excitation to the two terminals of the Y plane and via a voltage of a short contact point obtained through connecting the two terminals of the X plane via external resistors having the same resistance value; the contact resistance detection which the contact resistance detection module 1902 is based on, based on a resistance partial pressure ratio of the contact resistance relative to the above any one plane as well as coordinates of the midpoint in the above any one plane; the second ratio obtained by the contact resistance detection module 1902 being equal to a product of the above resistance partial pressure ratio and a dividing ratio of the total resistance of the any one plane created by the midpoint;

a distance of two points calculation module 1903 configured to calculate a distance between the two points in the X plane and the Y plane based on the resistance variance ratio, the first ratio, the second ratio, and a correlated relationship of the distance between the two points;

The correlated relationship which the distance of two points calculation module 1903 is based on, can be established in advance, according to resistance relationship of the X plane and the Y plane after a two-point touch occurs and based on corresponding relationship of a resistance between the two points in the X plane and the Y plane; the corresponding relationship can be determined according to the inclination angle of the connecting line between the two points as well as a resistance value ratio coefficient between the X plane and the Y plane.

It can be seen form the above detection apparatus, since the correlated relationship containing the distance between the two points is established based on the corresponding relationship between the inclination angle and the resistance variance ratio and according to the resistance relationship of the X plane and the Y plane after a two-point touch occurs, thus, taking the resistance variance ratio and the first ratio obtained by the resistance change detection module 1901 as well as the second ratio obtained by the contact resistance detection module 1902 as known variables in the correlated relationship can obtain the specific size of the distance between the two points through calculation of the distance of two points calculation module 1903 according to the correlated relationship.

Realization principles and implementations of the resistance change detection module 1901 are the same as those of the detection method, for example, the step 301 in the process shown in FIG. 3 and FIG. 4. Realization principles and implementations of the contact resistance detection module 1902 are the same as those of the detection method, for example, the step 302 in the process shown in FIG. 3 and FIG. 4. Realization principles and implementations of the distance of two points calculation module 1903 are the same as those of the detection method, for example, the step 303 in the process shown in FIG. 3 and FIG. 4.

Figure 16:
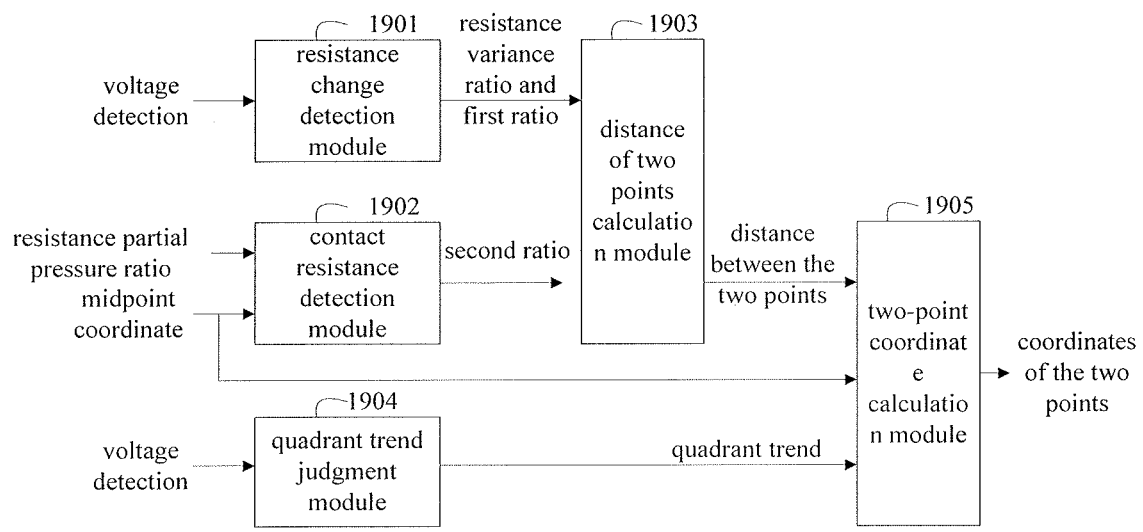
FIG. 16 is an exemplary diagram of a resistive touch panel detection apparatus which is suitable for two-point touch and is extended based on the structure shown in FIG. 15, according to one embodiment of the present invention.

FIG. 16 is an exemplary diagram of a resistive touch panel detection apparatus which is suitable for two-point touch and is extended based on the structure shown in FIG. 15, according to one embodiment of the present invention. As shown in FIG. 16, the detection apparatus includes the resistance change detection module 1901, the contact resistance detection module 1902 and the distance of two points calculation module 1903 shown in FIG. 15, and further includes:

a quadrant trend judgment module 1904 configured to, based on voltage relationship between two ends of each of the X plane and the Y plane, judge and obtain a quadrant trend of the connecting line between the two points; after voltage relationship between two ends of one of the X plane and the Y plane is determined, the quadrant trend being determined according to a positive or negative direction of a voltage difference between two ends of the other one of the X plane and the Y plane;

a two-point coordinate calculation module 1905 configured to, based on the quadrant trend, coordinates of the midpoint in the X plane and the Y plane as well as distances between the two points in the X plane and the Y plane, calculate coordinates of the two points in the X plane and the Y plane; the coordinates of the two points in the X plane obtained by the two-point coordinate calculation module 1905 being the coordinate of the midpoint in the X plane plus or minus one half of the distance between the two points in the X plane, respectively; the coordinates of the two points in the Y plane being the coordinate of the midpoint in the Y plane plus or minus one half of the distance between the two points in the Y plane, respectively; the plus or minus being determined by coordinate increasing and decreasing relationship of the two points relative to the midpoint, and the coordinate increasing and decreasing relationship being represented by the quadrant trend.

It can be seen from the above detection apparatus, since the quadrant trend of the connecting line between the two points can be judged by the quadrant trend judgment module 1904, and thus the two-point coordinate calculation module 1905 can obtain the actual coordinates of the two points according to the quadrant trend, the detected coordinates of the midpoint and the calculated distance between the two points.

Realization principles and implementations of the quadrant trend judgment module 1904 are the same as those of the detection method, for example, the step 304 in the process shown in FIG. 4. Realization principles and implementations of the two-point coordinate calculation module 1905 are based on the conventional geometry relationship and will not be repeated here.

In actual application, the detection apparatuses can further include a two-point touch judgment module and a single-point coordinate calculation module (not shown in figures). The two-point touch judgment module can realize judgment of whether a two-point occurs according to operation manners of the process shown in FIG. 1, and trigger the single-point coordinate calculation module when determining that a single-point touch occurs, and trigger other modules when determining that a two-point touch occurs. The single-point coordinate calculation module can calculate coordinates of the single point according to principles of the short contact detection mode shown in FIG. 11*a* and FIG. 11*b*.

Further, the detection apparatuses shown in FIGS. 14-16 can be carried in the processor 1405 of the circuit shown in FIG. 13. One skilled in the art can understand, the modules of the above detection apparatus can be disposed in the processor 1405 of the above circuit according to the above description, and can also be modified to be disposed in one or more devices different from the above circuit; the modules of the above detection apparatus can be merged into one module, or can further be divided into more sub-modules.

According to the above description, it can be clearly understood by one skilled in the art that the technical solution of the present invention can be realized by software accompanying with necessary general hardware platforms, or by hardware. In many cases, the former is a preferred manner.

Based on this, the essential part of the technical solution of the present invention or the part contributed to the prior art can be in the form of a software product. Specifically, a system or apparatus having a storage medium can be provided, the storage medium stores machine-readable program codes for implementing the above detection method and the detection apparatus and to make the system or the apparatus (or CPU or MPU) read and execute the program codes stored in the storage medium.

In this situation, the program codes read from the storage medium may implement functions of the above detection method and detection apparatus, thus the program codes and the storage medium storing the program codes are part of the technical solution of the above detection method and detection apparatus.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize functions of any of the above embodiments.

In addition, the program codes implemented from a storage medium are written in a storage in an extension board inserted in the computer or in a storage in an extension unit connected to the computer. A CPU in the extension board or the extension unit executes at least part of the operations according to the instructions based on the program codes to realize functions of the detection method and detection apparatus.

The foregoing are only preferred embodiments of the present invention, and are not used to limit the present invention. Any modification, equivalent replacement, or improvement made without departing from the spirit and principle of the present invention should fall within the scope of the present invention.

The invention claimed is:

1. A method for detecting distance between two points on a resistive touch panel comprising:
   step b1: based on voltage detections before touching and after a two-point touch occurs, calculating a resistance variance ratio of a Y plane relative to an X plane as well as a first ratio of a resistance variance of any one plane of the X plane and the Y plane relative to a total resistance of the any one plane; wherein the resistance variance ratio is proportional to a voltage variance ratio of the Y plane relative to the X plane, the first ratio is proportional to a ratio between a voltage variance of the any one plane and a voltage of the any one plane when there is no touching;
   step b2: based on a contact resistance detection after a two-point touch occurs, calculating a second ratio of an equivalent contact resistance at a midpoint between two points relative to the total resistance of the any one plane; wherein the contact resistance detection is based on a resistance partial pressure ratio of the contact resistance relative to the any one plane as well as a coordinate of the midpoint in the any one plane; the second ratio equals to a product of the resistance partial pressure ratio and a dividing ratio of the total resistance of the any one plane created by the midpoint;
   step b3: calculating a distance between the two points according to the resistance variance ratio, the first ratio, the second ratio and a correlated relationship of the distance between the two points; wherein the correlated relationship is established in advance, according to resistance relationship of the X plane and the Y plane after a two-point touch occurs and based on corresponding relationship between an inclination angle of a connecting line between the two points and the resistance variance ratio.

2. The method for detecting distance between two points on a resistive touch panel of claim 1, wherein
   the voltage detection of the step b1 is achieved by applying current excitation to the X plane and the Y plane, respectively, and detecting a voltage of an end which is of each of the X plane and the Y plane, wherein the end which is of each of the X plane and the Y plane is connected with a current source; and the resistance variance ratio obtained in the step b1 via calculation equals to a voltage variance ratio of the Y plane relative to the X plane; the first ratio equals to a ratio of a voltage variance of the any one plane relative to a voltage of the any one plane when there is no touching;
   or,
   the voltage detection of the step b1 is achieved by connecting in series external resistors to two ends of each of the X plane and the Y plane respectively or only one end of each of the X plane and the Y plane, applying voltage excitation to the two ends which connect the external resistors in series, respectively, and detecting a voltage difference between the two ends of each of the X plane and the Y plane; and the resistance variance ratio obtained in the step b1 via calculation equals to a product of a voltage variance ratio of the Y plane relative to the X plane and a preset first scaling factor; the first ratio equals to a product of a ratio of a voltage variance of the any one plane relative to a voltage of the any one plane when there is no touching and a preset second scaling factor.

3. The method for detecting distance between two points on a resistive touch panel of claim 2, wherein
   detection of the resistance partial pressure ratio in the step b2 is realized by applying voltage excitation on the end of the any one plane and any end of an other plane, and taking an other end of the any one plane and the other end of the other one plane as voltage detection points; the resistance partial pressure ratio obtained in the step b2 is a partial pressure ratio of the contact resistance relative to one segment of resistance in the any one plane; the one segment of resistance is from an end of the any one plane to one of the two points.

4. The method for detecting distance between two points on a resistive touch panel of claim 2, wherein the any one plane is the X plane, the correlated relationship of the step b3 includes:

$$X_{2,ratio} = \frac{\left(1 + \sqrt{\Delta R_y/\Delta R_x}\right)\frac{\Delta R_x}{R_{x,tot}} + \sqrt{\left(1 + \sqrt{\Delta R_y/\Delta R_x}\right)^2\left(\frac{\Delta R_x}{R_{x,tot}}\right)^2 + 8\frac{\Delta R_x}{R_{x,tot}}Z_{ratio}}}{2};$$

$$Z_{2,ratio} = \frac{R_{touch}}{R_{x,tot}} + \sqrt{\left(\frac{R_{touch}}{R_{x,tot}}\right)^2 + \frac{R_{touch}}{R_{x,tot}}\left(1 + \sqrt{\Delta R_y/\Delta R_x}\right)\left[1 - \frac{X_{2,ratio}}{2D(X_{mid})}\right]X_{2,ratio}}$$

or $$Z_{ratio} = 2\frac{R_{touch}}{R_{x,tot}};$$

$$k_{xy}\tan\theta = \sqrt{\Delta R_y/\Delta R_x};$$

$$y_{2,ratio} = x_{2,ratio}\tan\theta/k_{xy};$$

where, $x_{2,ratio}$ is a normalized distance between two points in the X plane; $\Delta R_y$ is the resistance variance of the Y plane, $\Delta R_x$ is the resistance variance of the X plane, $R_{x,tot}$ is a total resistance of the X plane, $\Delta R_y/\Delta R_x$ is the resistance variance ratio, $\Delta R_x/R_{x,tot}$ is the first ratio; $z_{ratio}$ is a ratio of the contact resistance at each touch point relative to the total resistance of the X plane; $R_{touch}$ is the equivalent contact resistance, $$\frac{R_{touch}}{R_{x,tot}}$$

is the second ratio; $D(x_{mid})$ is a dividing ratio of the total resistance $R_{x,tot}$ of the X plane created by the midpoint; $k_{xy}\tan\theta = \sqrt{\Delta R_y/\Delta R_x}$ is the corresponding relationship, $k_{xy}$ is a ratio coefficient between the Y plane and the X plane, $\theta$ is the inclination angle with reference to an X direction corresponding to the X plane; $y_{2,ratio}$ is a normalized distance between two points in the Y plane.

5. The method for detecting distance between two points on a resistive touch panel of claim 2, further comprising:
   step b4: based on voltage relationship between two ends of each of the X plane and the Y plane, judging and obtaining a quadrant trend of a connecting line between the two points; wherein, after voltage relationship between two ends of one plane of the X plane and the Y plane is determined, the quadrant trend is determined according to a positive or negative direction of a voltage difference between two ends of the other one plane of the X plane and the Y plane;
   step b5: based on the quadrant trend, coordinates of the midpoint in the X plane and the Y plane as well as the distances between the two points in the X plane and the Y plane, calculating coordinates of the two points in the X plane and the Y plane; wherein the coordinates of the two points in the X plane are the coordinate of the midpoint in the X plane plus or minus one half of the distance between the two points in the X plane, respectively; the coordinates of the two points in the Y plane are the coordinate of the midpoint in the Y plane plus or minus one half of the distance between the two points in the Y plane, respectively; the plus or minus is determined by coordinate increasing and decreasing relationship of the two points relative to the midpoint, and the coordinate increasing and decreasing relationship is represented by the quadrant trend.

6. The method for detecting distance between two points on a resistive touch panel of claim 1, wherein
   detection of the midpoint's coordinate in the X plane of the step b1 is realized by applying voltage excitation to two ends of the X plane and by a voltage of a short contact point obtained through connecting two ends of the Y plane via external resistors having a same resistance value;
   detection of the midpoint's coordinate in the Y plane of the step b2 is realized by applying voltage excitation to the two ends of the Y plane and by a voltage of a short contact point obtained through connecting the two ends of the X plane via external resistors having a same resistance value.

7. The method for detecting distance between two points on a resistive touch panel of claim 1, wherein
   detection of the resistance partial pressure ratio in the step b2 is realized by applying voltage excitation on the end of the any one plane and any end of an other plane, and taking an other end of the any one plane and the other end of the other one plane as voltage detection points; the resistance partial pressure ratio obtained in the step b2 is a partial pressure ratio of the contact resistance relative to one segment of resistance in the any one plane; the one segment of resistance is from an end of the any one plane to one of the two points.

8. The method for detecting distance between two points on a resistive touch panel of claim 1, wherein the any one plane is the X plane, the correlated relationship of the step b3 includes:

$$x_{2,ratio} = \left(1 + \sqrt{\Delta R_y/\Delta R_x}\right)\frac{\Delta R_x}{R_{x,tot}} + \frac{\sqrt{\left(1 + \sqrt{\Delta R_y/\Delta R_x}\right)^2\left(\frac{\Delta R_x}{R_{x,tot}}\right)^2 + 8\frac{\Delta R_x}{R_{x,tot}}z_{ratio}}}{2};$$

$$z_{2,ratio} = \frac{R_{touch}}{R_{x,tot}} + \sqrt{\left(\frac{R_{touch}}{R_{x,tot}}\right)^2 + \frac{R_{touch}}{R_{x,tot}}\left(1 + \sqrt{\Delta R_y/\Delta R_x}\right)\left[1 - \frac{x_{2,ratio}}{2D(x_{mid})}\right]x_{2,ratio}}$$

-continued or $$z_{ratio} = 2\frac{R_{touch}}{R_{x,tot}};$$

$$k_{xy}\tan\theta = \sqrt{\Delta R_y/\Delta R_x};$$

$$y_{2,ratio} = x_{2,ratio}\tan\theta/k_{xy};$$

where, $x_{2,ratio}$ is a normalized distance between two points in the X plane; $\Delta R_y$ is the resistance variance of the Y plane, $\Delta R_X$ is the resistance variance of the X plane, $R_{x,tot}$ is a total resistance of the X plane, $\Delta R_y/\Delta R_X$ is the resistance variance ratio, $\Delta R_x/R_{x,tot}$ is the first ratio; $z_{ratio}$ is a ratio of the contact resistance at each touch point relative to the total resistance of the X plane; $R_{touch}$ is the equivalent contact resistance, $$\frac{R_{touch}}{R_{x,tot}}$$

is the second ratio; D ($x_{mid}$) is a dividing ratio of the total resistance $R_{x,tot}$ of the X plane created by the midpoint; $k_{xy}$ tan $\theta=\sqrt{\Delta R_y/\Delta R_x}$ is the corresponding relationship, $k_{xy}$ is a ratio coefficient between the Y plane and the X plane, $\theta$ is the inclination angle with reference to an X direction corresponding to the X plane; $y_{2,ratio}$ is a normalized distance between two points in the Y plane.

9. The method for detecting distance between two points on a resistive touch panel of claim 1, further comprising:
   step b4: based on voltage relationship between two ends of each of the X plane and the Y plane, judging and obtaining a quadrant trend of a connecting line between the two points; wherein, after voltage relationship between two ends of one plane of the X plane and the Y plane is determined, the quadrant trend is determined according to a positive or negative direction of a voltage difference between two ends of the other one plane of the X plane and the Y plane;
   step b5: based on the quadrant trend, coordinates of the midpoint in the X plane and the Y plane as well as the distances between the two points in the X plane and the Y plane, calculating coordinates of the two points in the X plane and the Y plane; wherein the coordinates of the two points in the X plane are the coordinate of the midpoint in the X plane plus or minus one half of the distance between the two points in the X plane, respectively; the coordinates of the two points in the Y plane are the coordinate of the midpoint in the Y plane plus or minus one half of the distance between the two points in the Y plane, respectively; the plus or minus is determined by coordinate increasing and decreasing relationship of the two points relative to the midpoint, and the coordinate increasing and decreasing relationship is represented by the quadrant trend.

10. An apparatus for detecting distance between two points on a resistive touch panel comprising:
    a resistance change detection module configured to, based on voltage detections before touching and after a two-point touch occurs, calculate a resistance variance ratio of a Y plane relative to an X plane as well as a first ratio of a resistance variance of any one plane of the X plane and the Y plane relative to a total resistance of the any one plane; wherein the resistance variance ratio is proportional to a voltage variance ratio of the Y plane relative to the X plane, the first ratio is proportional to a ratio between a voltage variance of the any one plane and a voltage of the any one plane when there is no touching;
    a contact resistance detection module configured to, based on a contact resistance detection after a two-point touch occurs, calculate a second ratio of an equivalent contact resistance at a midpoint between two points relative to the total resistance of the any one plane; wherein the contact resistance detection is based on a resistance partial pressure ratio of the contact resistance relative to the any one plane as well as a coordinate of the midpoint in the any one plane; the second ratio equals to a product of the resistance partial pressure ratio and a dividing ratio of the total resistance of the any one plane created by the midpoint;
    a distance of two points calculation module configured to calculate a distance between the two points according to the resistance variance ratio, the first ratio, the second ratio and a correlated relationship of the distance between the two points; wherein the correlated relationship is established in advance, according to resistance relationship of the X plane and the Y plane after a two-point touch occurs and based on corresponding relationship between an inclination angle of a connecting line between the two points and the resistance variance ratio.

11. The apparatus for detecting distance between two points on a resistive touch panel of claim 10, wherein
    the voltage detection of the resistance change detection module is achieved by applying current excitation to the X plane and the Y plane, respectively, and detecting a voltage of an end which is of each of the X plane and the Y plane, wherein the end which is of each of the X plane and the Y plane is connected with a current source; and the resistance variance ratio obtained by the resistance change detection module via calculation equals to a voltage variance ratio of the Y plane relative to the X plane; the first ratio equals to a ratio of a voltage variance of the any one plane relative to a voltage of the any one plane when there is no touching;
    or, the voltage detection of the resistance change detection module is achieved by connecting in series external resistors to two ends of each of the X plane and the Y plane respectively or only one end of each of the X plane and the Y plane, applying voltage excitation to the two ends which connect the external resistors in series, respectively, and detecting a voltage difference between the two ends of each of the X plane and the Y plane; and the resistance variance ratio obtained by the resistance change detection module via calculation equals to a product of a voltage variance ratio of the Y plane relative to the X plane and a preset first scaling factor; the first ratio equals to a product of a ratio of a voltage variance of the any one plane relative to a voltage of the any one plane when there is no touching and a preset second scaling factor.

12. The apparatus for detecting distance between two points on a resistive touch panel of claim 11, wherein
    detection of the resistance partial pressure ratio of the contact resistance detection module is realized by applying voltage excitation on the end of the any one plane and any end of an other plane, and taking an other end of the any one plane and the other end of the other one plane as voltage detection points; the resistance partial pressure ratio obtained by the contact resistance detection module is a partial pressure ratio of the contact resistance relative to one segment of resistance in the any one plane; the one segment of resistance is from an end of the any one plane to one of the two points.

13. The apparatus for detecting distance between two points on a resistive touch panel of claim 11, wherein the any one plane is the X plane, the correlated relationship which the distance of two points calculation module is based on includes:

$$x_{2,ratio} = \frac{\left(1 + \sqrt{\Delta R_y/\Delta R_x}\right)\frac{\Delta R_x}{R_{x,tot}} + \sqrt{\left(1 + \sqrt{\Delta R_y/\Delta R_x}\right)^2\left(\frac{\Delta R_x}{R_{x,tot}}\right)^2 + 8\frac{\Delta R_x}{R_{x,tot}}z_{ratio}}}{2};$$

$$z_{2,ratio} = \frac{R_{touch}}{R_{x,tot}} + \sqrt{\left(\frac{R_{touch}}{R_{x,tot}}\right)^2 + \frac{R_{touch}}{R_{x,tot}}\left(1 + \sqrt{\Delta R_y/\Delta R_x}\right)\left[1 - \frac{x_{2,ratio}}{2D(x_{mid})}\right]x_{2,ratio}}$$

or $$z_{ratio} = 2\frac{R_{touch}}{R_{x,tot}};$$

$$k_{xy}\tan\theta = \sqrt{\Delta R_y/\Delta R_x};$$

$$y_{2,ratio} = x_{2,ratio}\tan\theta/k_{xy};$$

where, $x_{2,ratio}$ is a normalized distance between two points in the X plane; $\Delta R_y$ is the resistance variance of the Y plane, $\Delta R_X$ is the resistance variance of the X plane, $R_{x,tot}$ is a total resistance of the X plane, $\Delta R_y/\Delta R_X$ is the resistance variance ratio, $\Delta R_x/R_{x,tot}$ is the first ratio; $z_{ratio}$ is a ratio of the contact resistance at each touch point relative to the total resistance of the X plane; $R_{touch}$ is the equivalent contact resistance, $$\frac{R_{touch}}{R_{x,tot}}$$

is the second ratio; $D(x_{mid})$ is a dividing ratio of the total resistance $R_{x,tot}$ of the X plane created by the midpoint; $k_{xy}\tan\theta=\sqrt{\Delta R_y/\Delta R_x}$ is the corresponding relationship, $k_{xy}$ is a ratio coefficient between the Y plane and the X plane, $\theta$ is the inclination angle with reference to an X direction corresponding to the X plane; $y_{2,ratio}$ is a normalized distance between two points in the Y plane.

14. The apparatus for detecting distance between two points on a resistive touch panel of claim 11, further comprising:
a quadrant trend judgment module configured to, based on voltage relationship between two ends of each of the X plane and the Y plane, judge and obtain a quadrant trend of a connecting line between the two points; wherein, after voltage relationship between two ends of one plane of the X plane and the Y plane is determined, the quadrant trend is determined according to a positive or negative direction of a voltage difference between two ends of the other one plane of the X plane and the Y plane;
a two-point coordinate calculation module configured to, based on the quadrant trend, coordinates of the midpoint in the X plane and the Y plane as well as the distances between the two points in the X plane and the Y plane, calculate coordinates of the two points in the X plane and the Y plane; wherein the coordinates of the two points in the X plane are the coordinate of the midpoint in the X plane plus or minus one half of the distance between the two points in the X plane, respectively; the coordinates of the two points in the Y plane are the coordinate of the midpoint in the Y plane plus or minus one half of the distance between the two points in the Y plane, respectively; the plus or minus is determined by coordinate increasing and decreasing relationship of the two points relative to the midpoint, and the coordinate increasing and decreasing relationship is represented by the quadrant trend.

15. The apparatus for detecting distance between two points on a resistive touch panel of claim 10, wherein
detection of the midpoint's coordinate in the X plane of the contact resistance detection module is realized by applying voltage excitation to two ends of the X plane and by a voltage of a short contact point obtained through connecting two ends of the Y plane via external resistors having a same resistance value;
detection of the midpoint's coordinate in the Y plane of the contact resistance detection module is realized by applying voltage excitation to the two ends of the Y plane and by a voltage of a short contact point obtained through connecting the two ends of the X plane via external resistors having a same resistance value.

16. The apparatus for detecting distance between two points on a resistive touch panel of claim 10, wherein
detection of the resistance partial pressure ratio of the contact resistance detection module is realized by applying voltage excitation on the end of the any one plane and any end of an other plane, and taking an other end of the any one plane and the other end of the other one plane as voltage detection points; the resistance partial pressure ratio obtained by the contact resistance detection module is a partial pressure ratio of the contact resistance relative to one segment of resistance in the any one plane; the one segment of resistance is from an end of the any one plane to one of the two points.

17. The apparatus for detecting distance between two points on a resistive touch panel of claim 10, wherein the any one plane is the X plane, the correlated relationship which the distance of two points calculation module is based on includes:

$$x_{2,ratio} = \left(1 + \sqrt{\Delta R_y/\Delta R_x}\right)\frac{\Delta R_x}{R_{x,tot}} + \frac{\sqrt{\left(1 + \sqrt{\Delta R_y/\Delta R_x}\right)^2\left(\frac{\Delta R_x}{R_{x,tot}}\right)^2 + 8\frac{\Delta R_x}{R_{x,tot}}z_{ratio}}}{2};$$

$$z_{2,ratio} = \frac{R_{touch}}{R_{x,tot}} + \sqrt{\left(\frac{R_{touch}}{R_{x,tot}}\right)^2 + \frac{R_{touch}}{R_{x,tot}}\left(1 + \sqrt{\Delta R_y/\Delta R_x}\right)\left[1 - \frac{x_{2,ratio}}{2D(x_{mid})}\right]x_{2,ratio}}$$

or $$z_{ratio} = 2\frac{R_{touch}}{R_{x,tot}};$$

$$k_{xy}\tan\theta = \sqrt{\Delta R_y/\Delta R_x};$$

$$y_{2,ratio} = x_{2,ratio}\tan\theta/k_{xy};$$

where, $x_{2,ratio}$ is a normalized distance between two points in the X plane; $\Delta R_y$ is the resistance variance of the Y plane, $\Delta R_X$ is the resistance variance of the X plane, $R_{x,tot}$ is a total resistance of the X plane, $\Delta R_y/\Delta R_X$ is the resistance variance ratio, $\Delta R_x/R_{x,tot}$ is the first ratio; $z_{ratio}$ is a ratio of the contact resistance at each touch point relative to the total resistance of the X plane; $R_{touch}$ is the equivalent contact resistance, $$\frac{R_{touch}}{R_{x,tot}}$$

is the second ratio; $D(x_{mid})$ is a dividing ratio of the total resistance $R_{x,tot}$ of the X plane created by the midpoint; $k_{xy} \tan\theta=\sqrt{\Delta R_y/\Delta R_x}$ is the corresponding relationship, $k_{xy}$ is a ratio coefficient between the Y plane and the X plane, $\theta$ is the inclination angle with reference to an X direction corresponding to the X plane; $y_{2,ratio}$ is a normalized distance between two points in the Y plane.

18. The apparatus for detecting distance between two points on a resistive touch panel of claim 10, further comprising:
a quadrant trend judgment module configured to, based on voltage relationship between two ends of each of the X plane and the Y plane, judge and obtain a quadrant trend of a connecting line between the two points; wherein, after voltage relationship between two ends of one plane of the X plane and the Y plane is determined, the quadrant trend is determined according to a positive or negative direction of a voltage difference between two ends of the other one plane of the X plane and the Y plane;
a two-point coordinate calculation module configured to, based on the quadrant trend, coordinates of the midpoint in the X plane and the Y plane as well as the distances between the two points in the X plane and the Y plane, calculate coordinates of the two points in the X plane and the Y plane; wherein the coordinates of the two points in the X plane are the coordinate of the midpoint in the X plane plus or minus one half of the distance between the two points in the X plane, respectively; the coordinates of the two points in the Y plane are the coordinate of the midpoint in the Y plane plus or minus one half of the distance between the two points in the Y plane, respectively; the plus or minus is determined by coordinate increasing and decreasing relationship of the two points relative to the midpoint, and the coordinate increasing and decreasing relationship is represented by the quadrant trend.

* * * * *